US011725396B2

(12) United States Patent
Stuchell

(10) Patent No.: US 11,725,396 B2
(45) Date of Patent: Aug. 15, 2023

(54) TILE-SECURING SYSTEM AND RELATED METHODS

(71) Applicant: Silca System, LLC, Alliance, OH (US)

(72) Inventor: Bart Stuchell, Alliance, OH (US)

( * ) Notice: Subject to any disclaimer, the term of this patent is extended or adjusted under 35 U.S.C. 154(b) by 22 days.

(21) Appl. No.: 17/339,335

(22) Filed: Jun. 4, 2021

(65) Prior Publication Data
US 2021/0381257 A1    Dec. 9, 2021

Related U.S. Application Data

(60) Provisional application No. 63/036,169, filed on Jun. 8, 2020.

(51) Int. Cl.
| | | |
|---|---|---|
| *E04F 15/02* | (2006.01) | |
| *E04F 15/08* | (2006.01) | |
| *F16B 35/00* | (2006.01) | |
| *E01C 5/00* | (2006.01) | |

(52) U.S. Cl.
CPC ........ *E04F 15/02044* (2013.01); *E01C 5/006* (2013.01); *E04F 15/08* (2013.01); *F16B 35/00* (2013.01); *E04F 15/02183* (2013.01); *E04F 2015/02111* (2013.01)

(58) Field of Classification Search
CPC ............... E04F 15/02044; E04F 15/08; E04F 15/02183; E04F 2015/02111; E01C 5/006; F16B 35/00
See application file for complete search history.

(56) References Cited

U.S. PATENT DOCUMENTS

| | | | |
|---|---|---|---|
| 6,804,923 B1 * | 10/2004 | Potter | E04B 5/04 52/480 |
| 2006/0144011 A1 * | 7/2006 | Symington | E04F 21/1838 52/782.1 |
| 2008/0271410 A1 * | 11/2008 | Matthee | E04F 15/082 52/749.11 |
| 2013/0074425 A1 * | 3/2013 | Miyamoto | E04F 13/0892 52/126.7 |
| 2017/0037643 A1 * | 2/2017 | Mitchell | E04F 13/0846 |
| 2018/0371763 A1 * | 12/2018 | Stuchell | E04F 15/087 |
| 2019/0055738 A1 * | 2/2019 | Vandenberg | F16B 5/0088 |

FOREIGN PATENT DOCUMENTS

EP        3124717 A1 *  2/2017

* cited by examiner

*Primary Examiner* — Theodore V Adamos

(57) ABSTRACT

A tile-securing system having a polymeric wedge component positioned between two adjacent tiles that are in plane and the polymeric wedge component contacting a side edge of each adjacent tile, wherein the polymeric wedge component exerts a force against both side edges; the polymeric wedge component being secured to a solid substrate using a fastener.

12 Claims, 29 Drawing Sheets

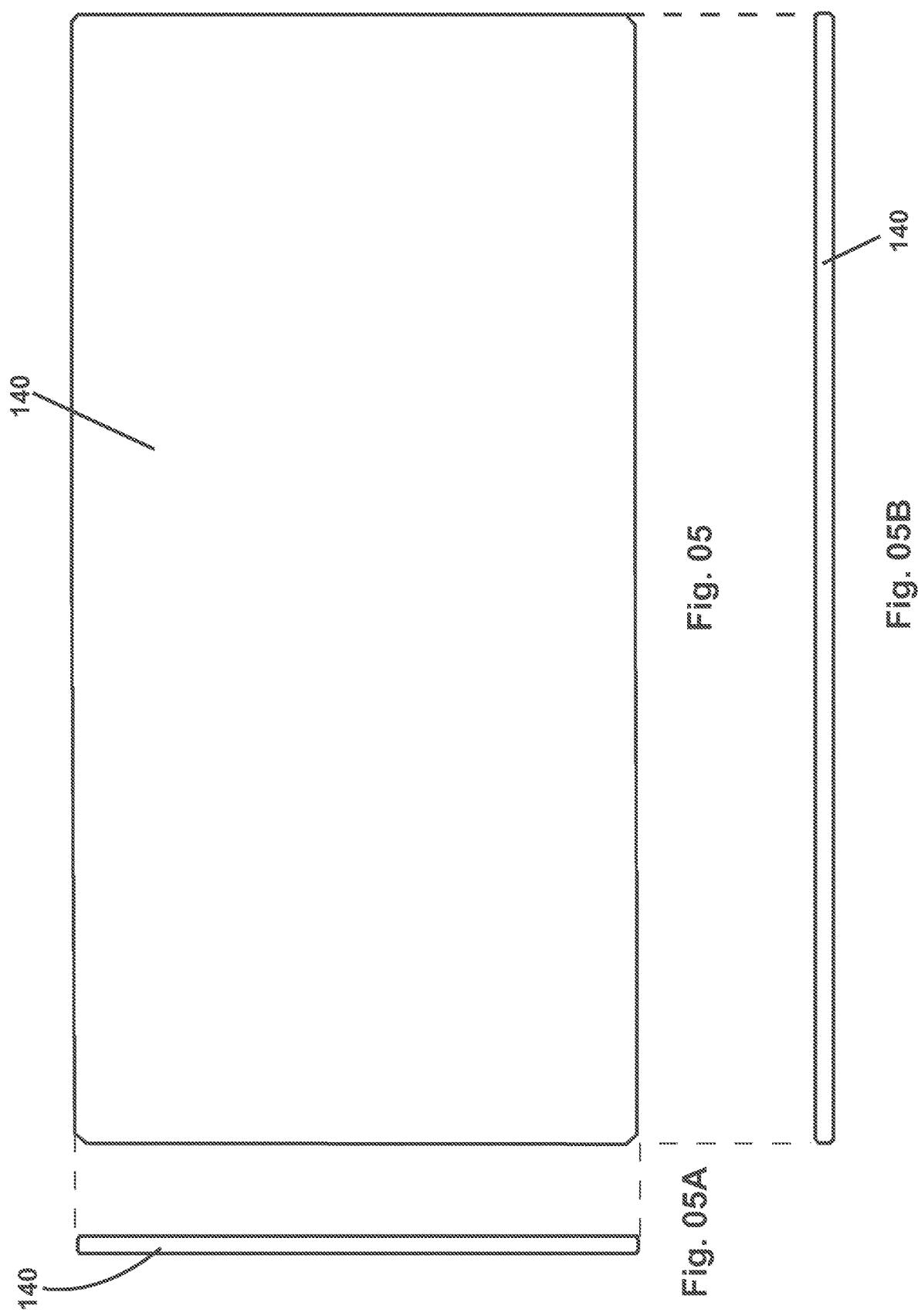

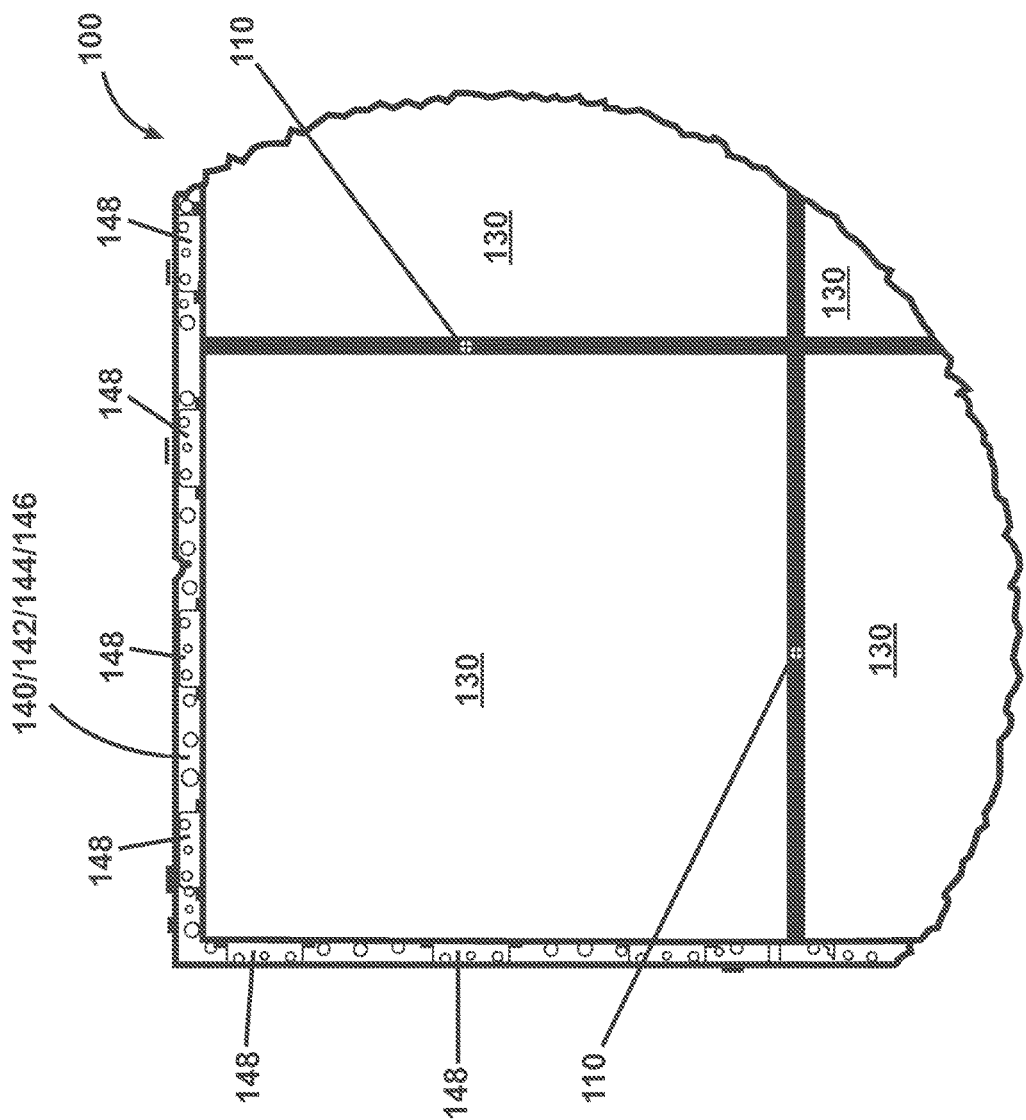

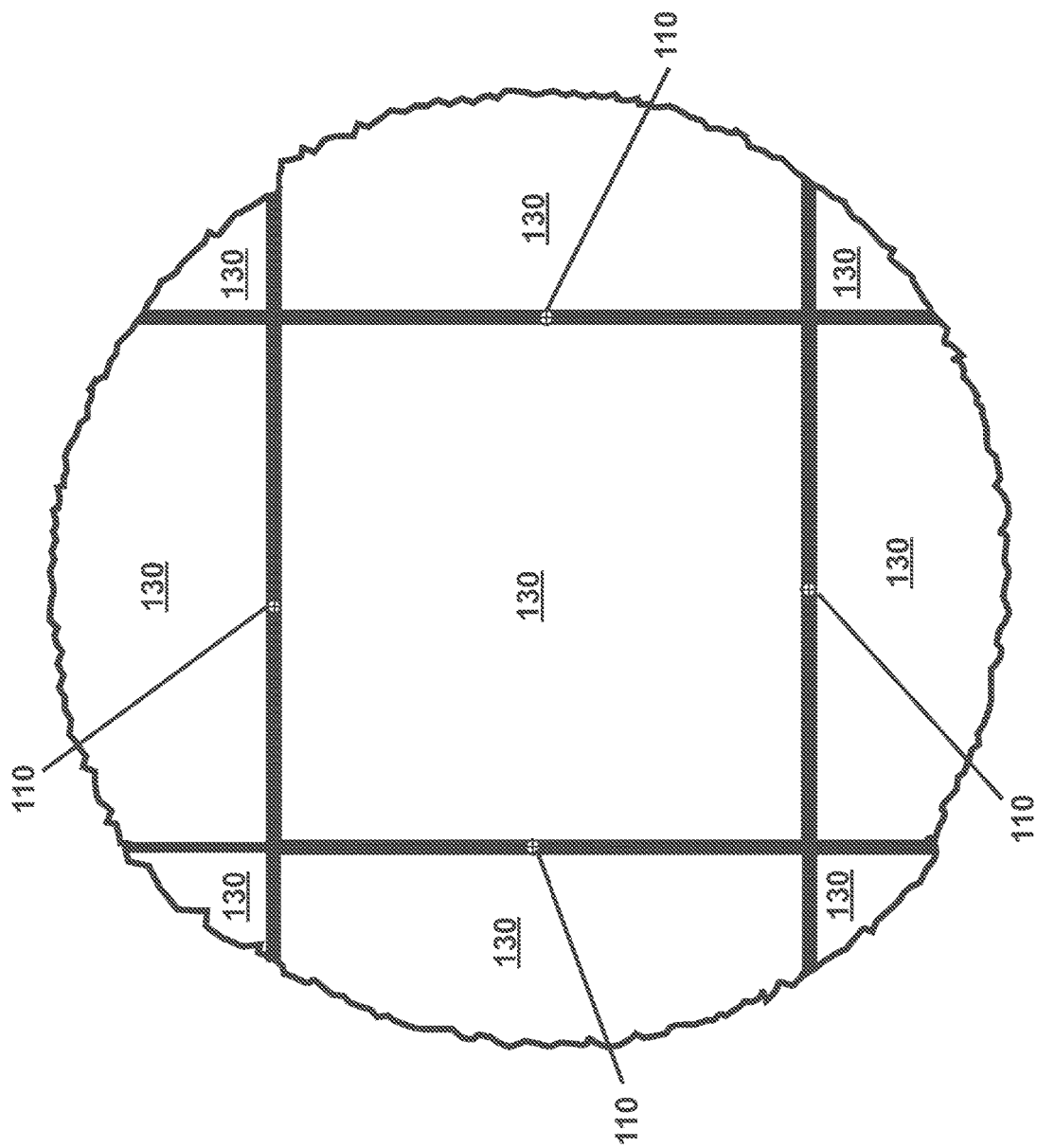

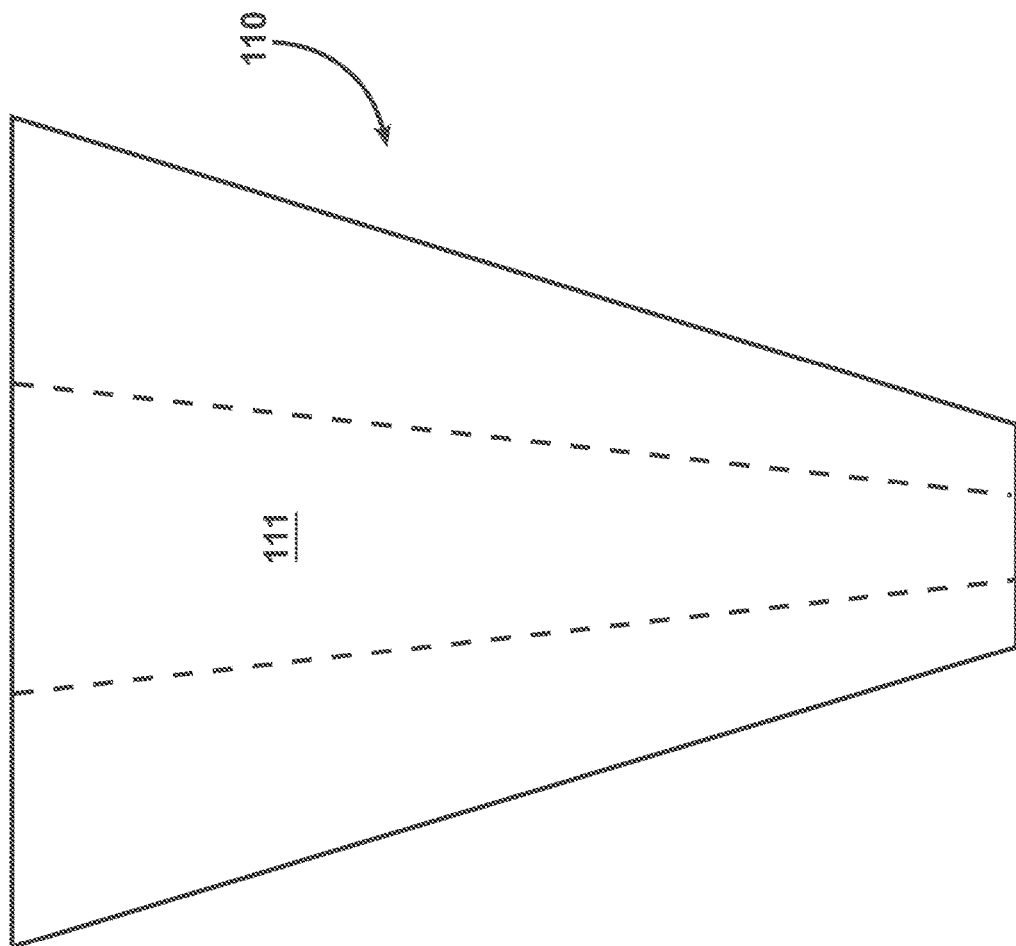

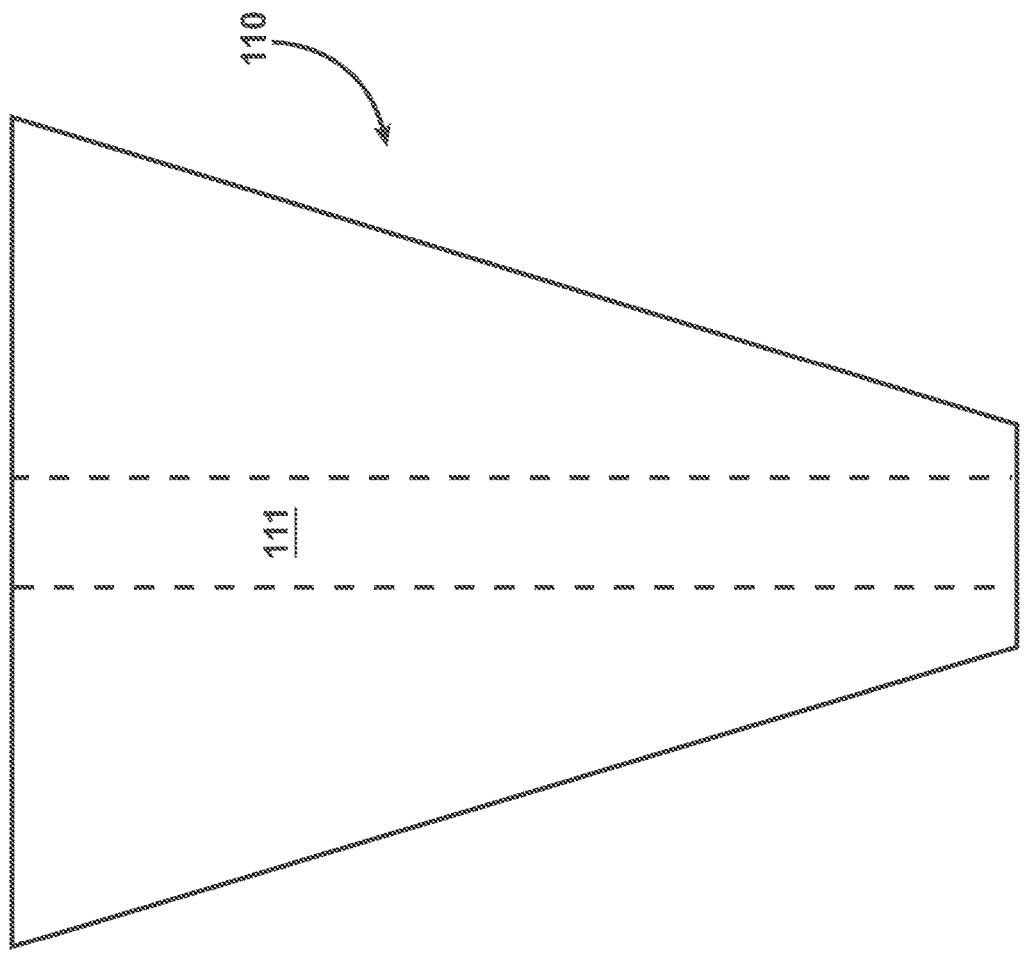

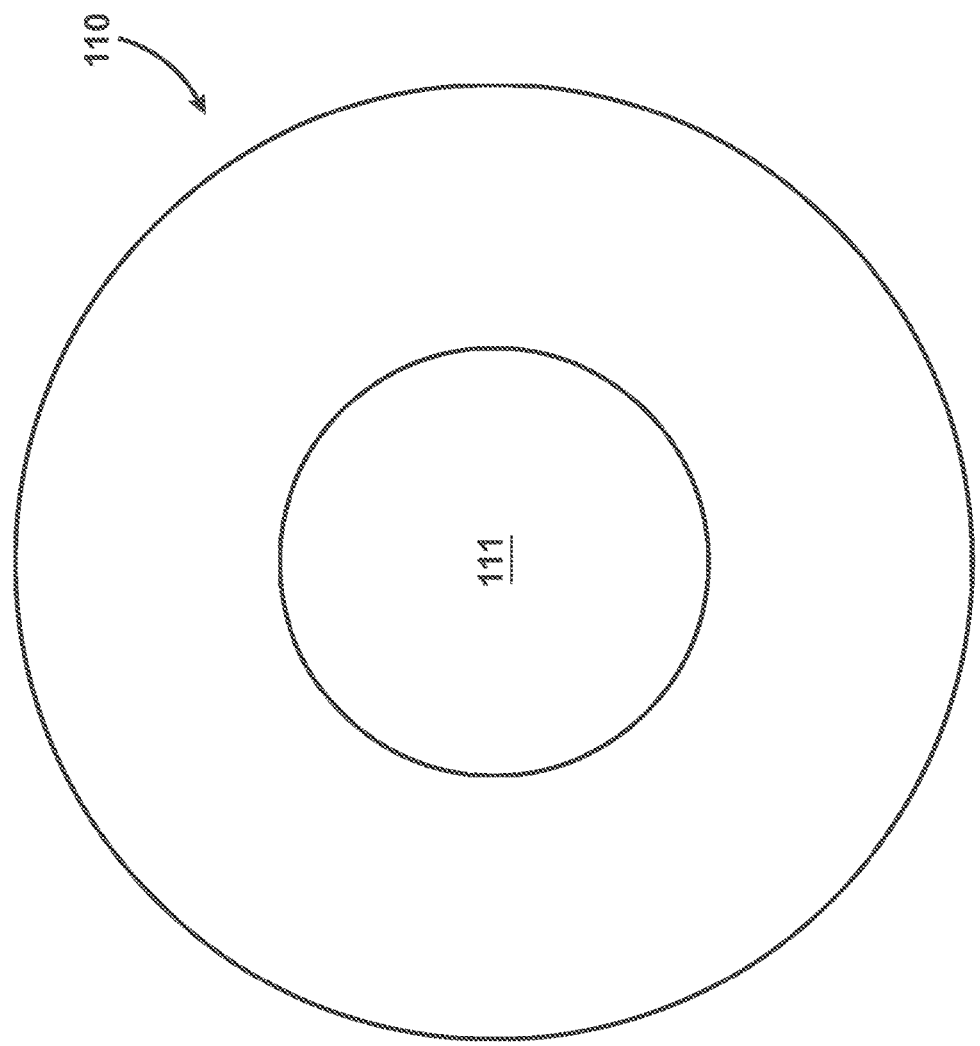

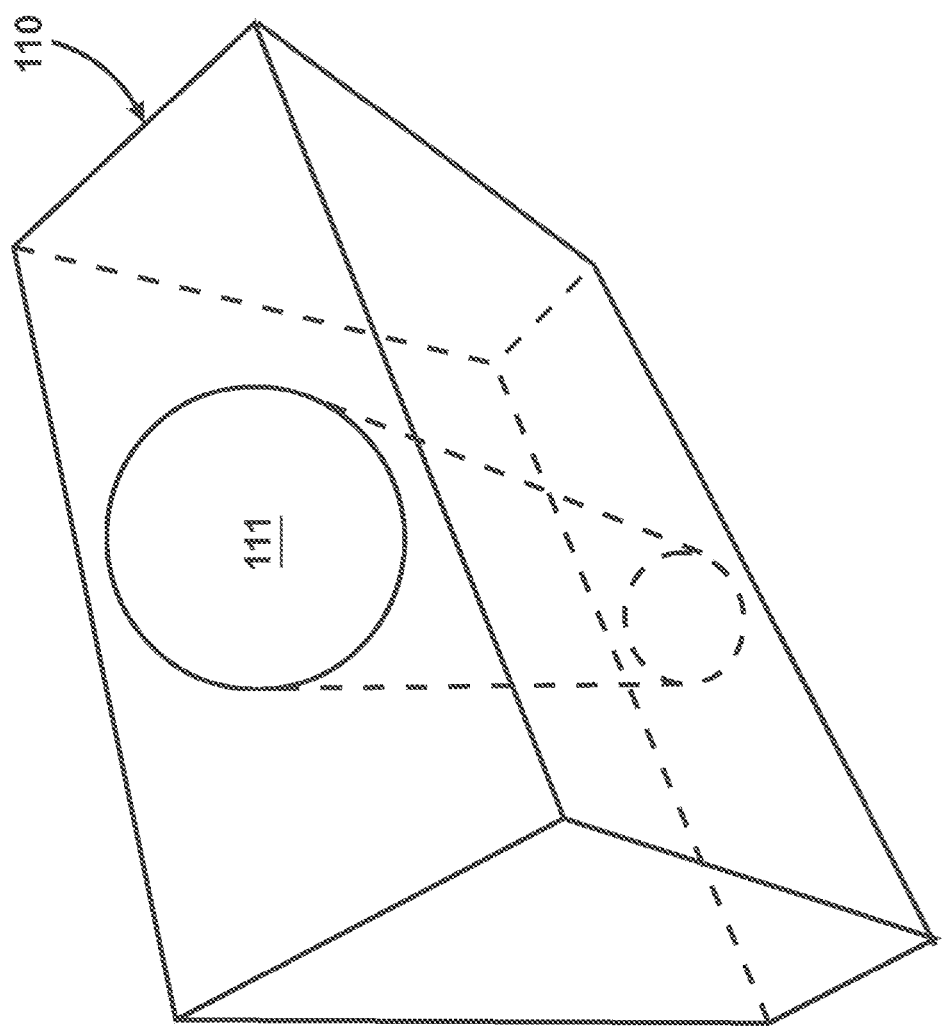

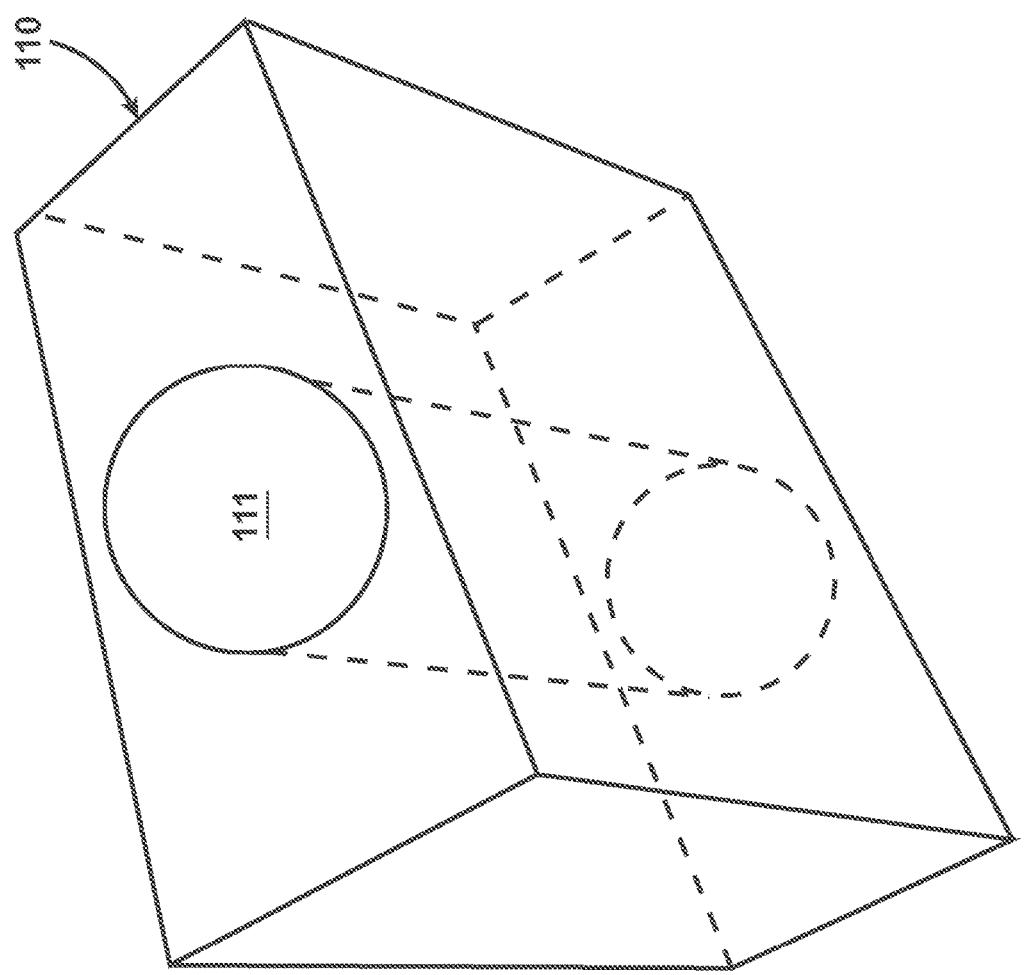

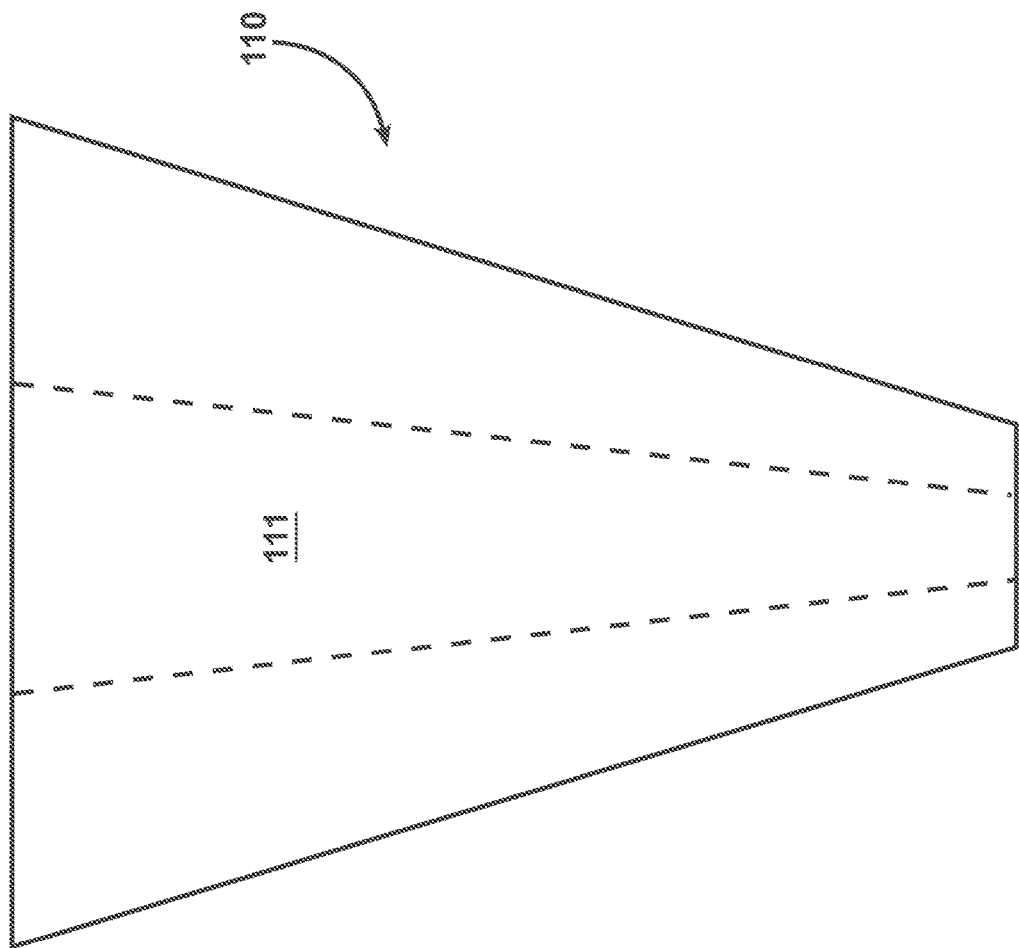

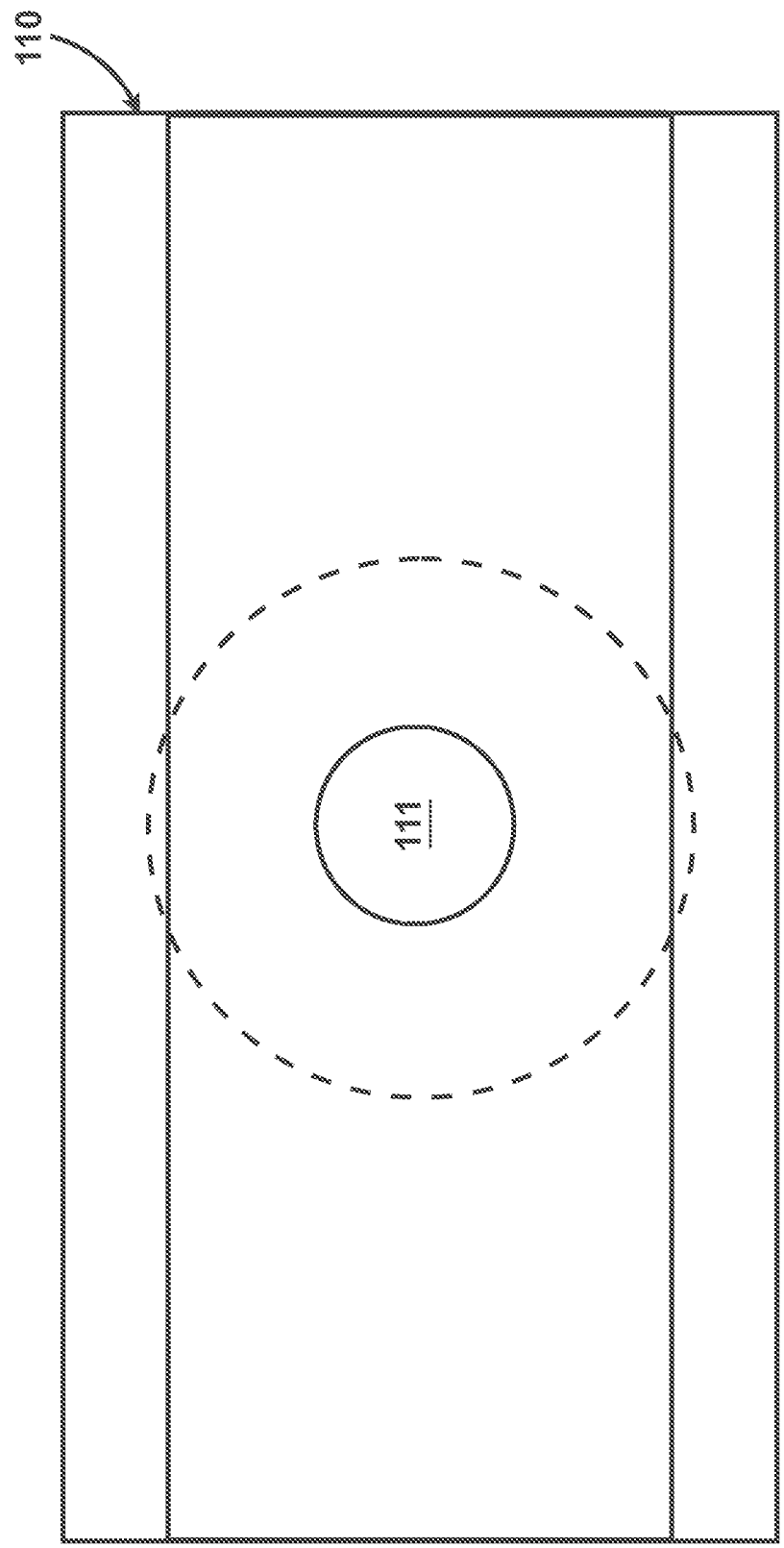

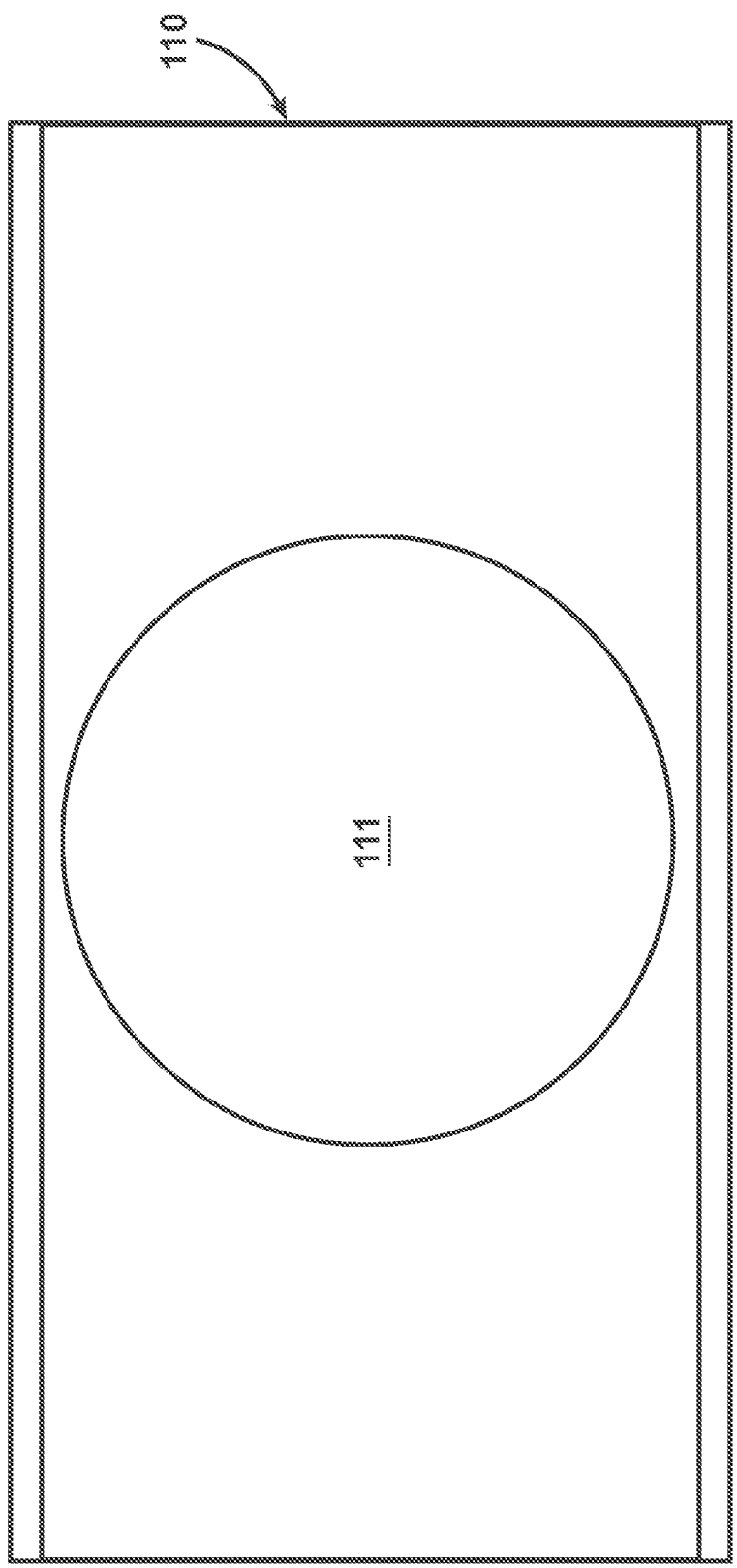

TILE-SECURING SYSTEM AND RELATED METHODS

CROSS-REFERENCE TO RELATED APPLICATIONS

This patent application claims priority to U.S. provisional patent application Ser. No. 63/036,169 titled, "Tile-Securing System"; it was filed on Jun. 8, 2020. The subject matter of provisional patent application 63/036,169 is hereby incorporated by reference into this application.

BACKGROUND OF THE INVENTION

Commercial rooftop decks, residential outside patios, and residential outside decks are well known—so are tile floor coverings that offer both cosmetic and durability benefits. To secure the tiles in place and ensure that they do not move or become displaced in high wind or other environmental conditions, tile-securing systems and methods are needed.

BRIEF SUMMARY OF THE INVENTION

A tile-securing system having a polymeric wedge component positioned between two adjacent tiles that are in plane and the polymeric wedge component contacting a side edge of each adjacent tile, wherein the polymeric wedge component exerts a force against both side edges; the polymeric wedge component being secured to a solid substrate using a fastener.

A tile securing system having a plurality of tiles being in plane and each of the tiles being adjacent to at least one other tile; the plurality of tiles being arranged in a pattern having a perimeter; the plurality of tiles resting upon a solid substrate; a plurality of polymeric wedge components secured to the solid substrate using a fastener; a polymeric wedge component positioned between adjacent tiles and the polymeric wedge component contacting a side edge of each adjacent tile, wherein the polymeric wedge component exerts a force against both side edges; and a perimeter securing component contacting a tile edge on the pattern perimeter and exerting a force against the tile edge on the pattern perimeter, the perimeter securing component secured in position to the solid substrate.

BRIEF DESCRIPTION OF THE SEVERAL VIEWS OF THE DRAWING

FIG. 05 is a top view of a solid-substrate component.
FIG. 05A is an end view of a solid-substrate component.
FIG. 05B is a side view of a solid-substrate component.
FIG. 07 is a magnified top view of a corner portion of an inventive embodiment that includes a plurality of tiles.
FIG. 08 is a magnified top view of a central portion of an inventive embodiment that includes a plurality of tiles.
FIG. 13 is an end view of a wedge component.
FIG. 13A is an end view of a wedge component.
FIG. 15A is a bottom view of a wedge component.
FIG. 16 is a perspective view of a wedge component.
FIG. 16A is a perspective view of a wedge component.
FIG. 17 is a side view of a wedge component.
FIG. 19 is a bottom view of a wedge component.
FIG. 19A is a bottom view of a wedge component.

DETAILED DESCRIPTION OF THE INVENTION

Embodiments are directed to a tile-securing system and related methods. For purposes of this patent application, "tile" means all known outdoor ground tiles that are solid and substantially inflexible. Non-limiting examples of useful tiles include rectified and non-rectified versions of: porcelain pavers, porcelain stone, porcelain tile, travertine stone, natural stone, and concrete pavers. Mechanical fasteners, such as screws or threaded bolts, can be used herein to fixedly attach one of the below-described elements to another, and a person skilled in the art will be able to do so without having to exercise undue experimentation.

Embodiments will be described with reference to the figures. Very generally, embodiments of tile-securing system 100 secure tiles 130 in position using pressure between adjacent tiles, and that pressure is created through the use of a plurality of polymeric wedge components 110 as shown in the figures.

Figure 6:
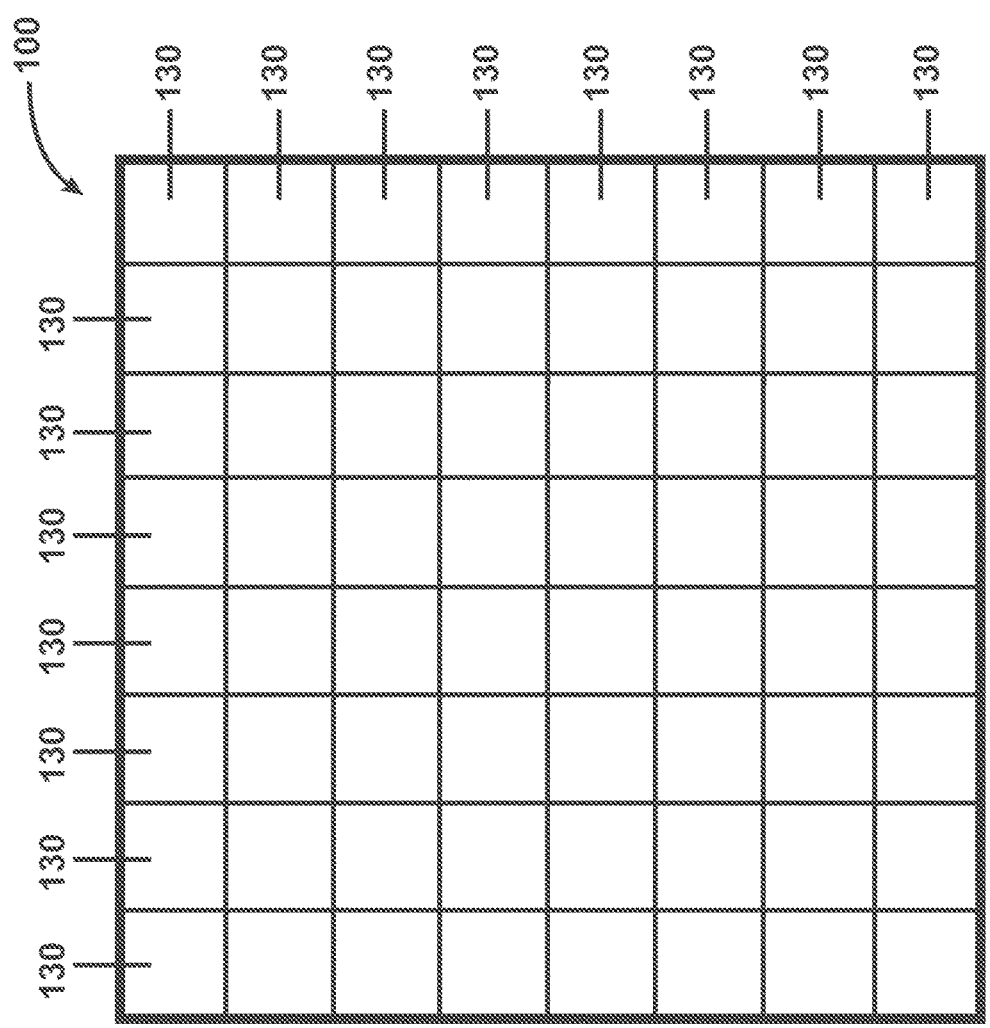
FIG. 06 is a top view of an inventive embodiment that includes a plurality of tiles.

FIG. 6 is a top view of a plurality of tiles 130 that are secured into place using an embodiment of tile-securing-system 100. Shown is a configuration of sixty-four square tiles 130 that are positioned adjacent to one another and in the same plane; it is exemplary of an outdoor tile configuration that might commonly be found on an outdoor patio of any household or apartment complex. Beyond the sixty-four tile 130 square configuration shown in FIG. 6, many other useful tile 130 configurations are certainly possible and can be designed to fit any patio footprint or other floor-plan footprint. Although individual tiles 130 are shown as being square in the figures, any other useful tile shape(s) can be employed in tile-securing system 100, for example tiles 130 can be rectangular, square, substantially circular, other useful shapes, or combinations thereof. Persons of ordinary skill in the art will be able to select useful tiles and useful tile configurations without having to exercise undue experimentation.

Figure 6A:
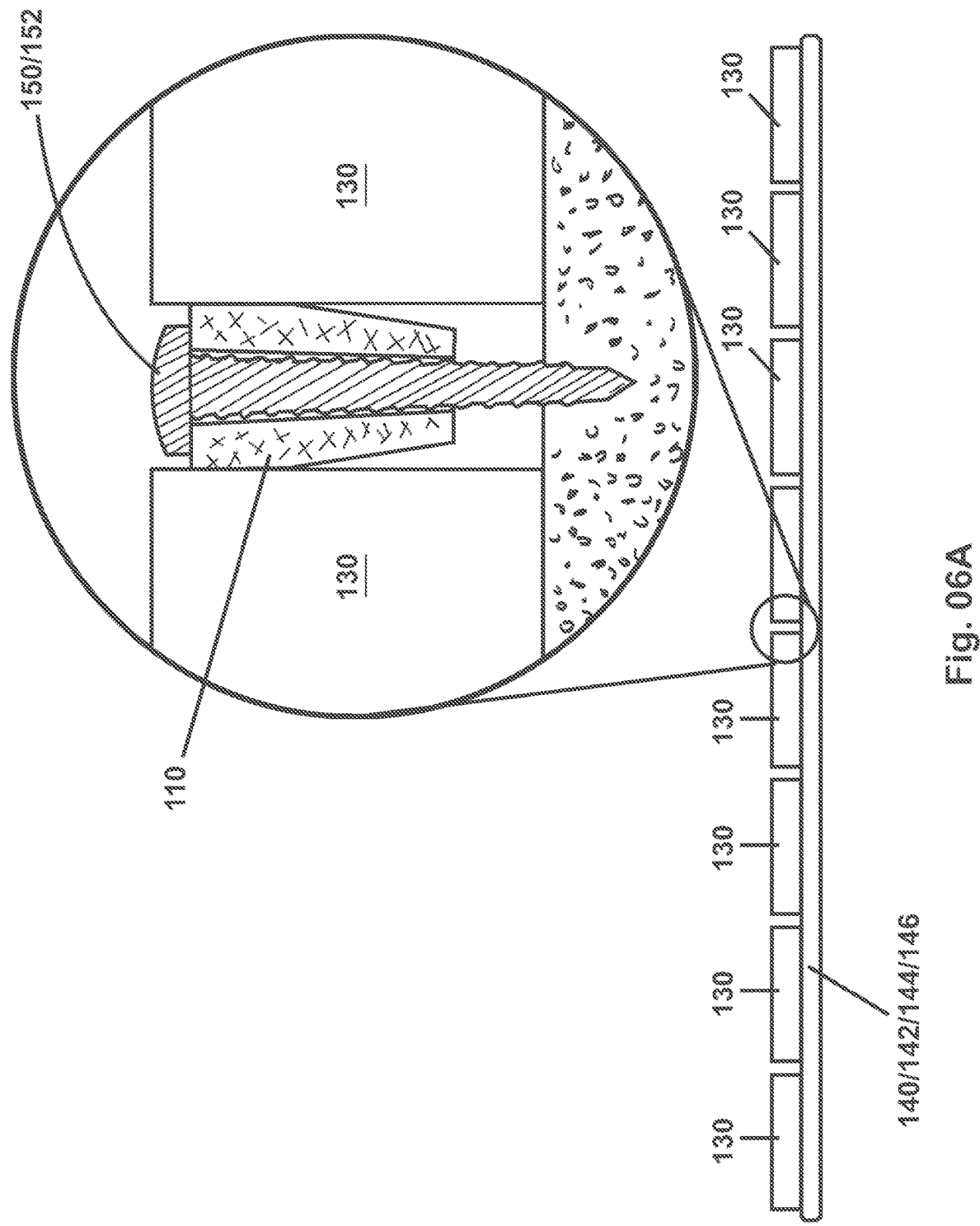
FIG. 06A is a magnified side view of an inventive embodiment that includes a plurality of tiles.

FIG. 6A shows a magnified side view of the FIG. 6 embodiment; tiles 130 are shown as resting in position in the same plane and upon solid substrate 140. The magnified view shows a cross-sectional view of polymeric wedge component 110 snugly fit and squeezed into position by fastener 150 that is fixedly secured into solid substrate 140. In the embodiment shown in FIG. 6A, fastener 150 is specifically screw 152, and screw 152 is within the wedge's screw channel 111 (screw channel 111 being shown in other figures); screw 152 is screwed into substrate 140 and due to the down force exerted during the screwing process, polymeric wedge component 110 is squeezed between adjacent tiles 130 that are shown on either side of the magnified view. In embodiments, substrate 140 can be polymeric solid substrate 142, plastic solid substrate 144, or rubber solid substrate 146. It will be appreciated from the magnified figure that polymeric wedge component 110 is snugly fit into position between tiles 130 such that the side portions of polymeric wedge component 110 that are compressed against tiles 130 and appear flattened; again, they are deformed and flattened due to pressure. Due to this polymeric-wedge-component compression or deformity, polymeric wedge component 110 naturally exerts a resilient pressure against tiles 130 (and vice versa), and the result is that polymeric wedge component 110 is literally pressure wedged (also called "pressure fit") into position between adjacent tiles 130. To appreciate the degree of compression and polymeric-wedge-component deformity shown in FIG. 6A; the flattened deformity can be relatively compared with various non-compressed and naturally shaped polymeric-wedge embodiments shown in FIGS. 04, 04A, 12-19A.

In embodiments, FIG. 6A's magnified view is representative of the cross sections of any number of wedge components that are positioned between adjacent tiles within an embodiment of tile-securing system 100.

Figure 3:
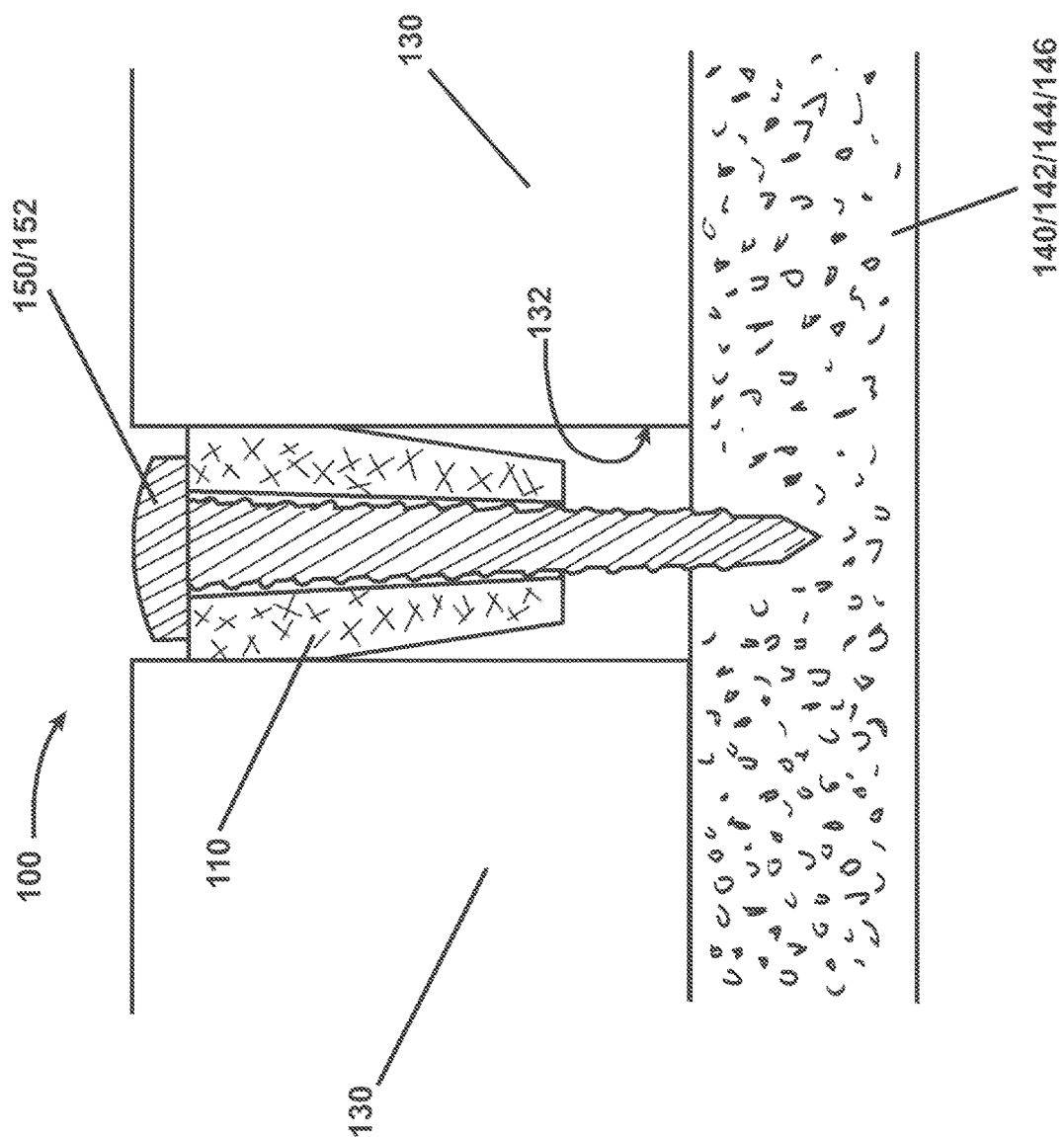
FIG. 03 is a cross-sectional side view of an inventive embodiment.

FIG. 03 provides additional detail to the illustration shown in FIG. 6A because tile side edge 132 is identified. Although shown as being rectified or perfectly flat and vertical in FIG. 03, tile-securing-system 100 embodiments can be employed using tiles 130 that are rectified or non-rectified; the non-rectified tiles having naturally jagged and slanted tile side edges 132. As shown in FIG. 03, tile side edge 132 can be understood from the figures as being rectified or non-rectified; the vertical line representing side edge 132 can be understood to be graphical drawing symbol or label representation of any type of conventional tile side edge 132—either rectified or non-rectified.

Figure 1:
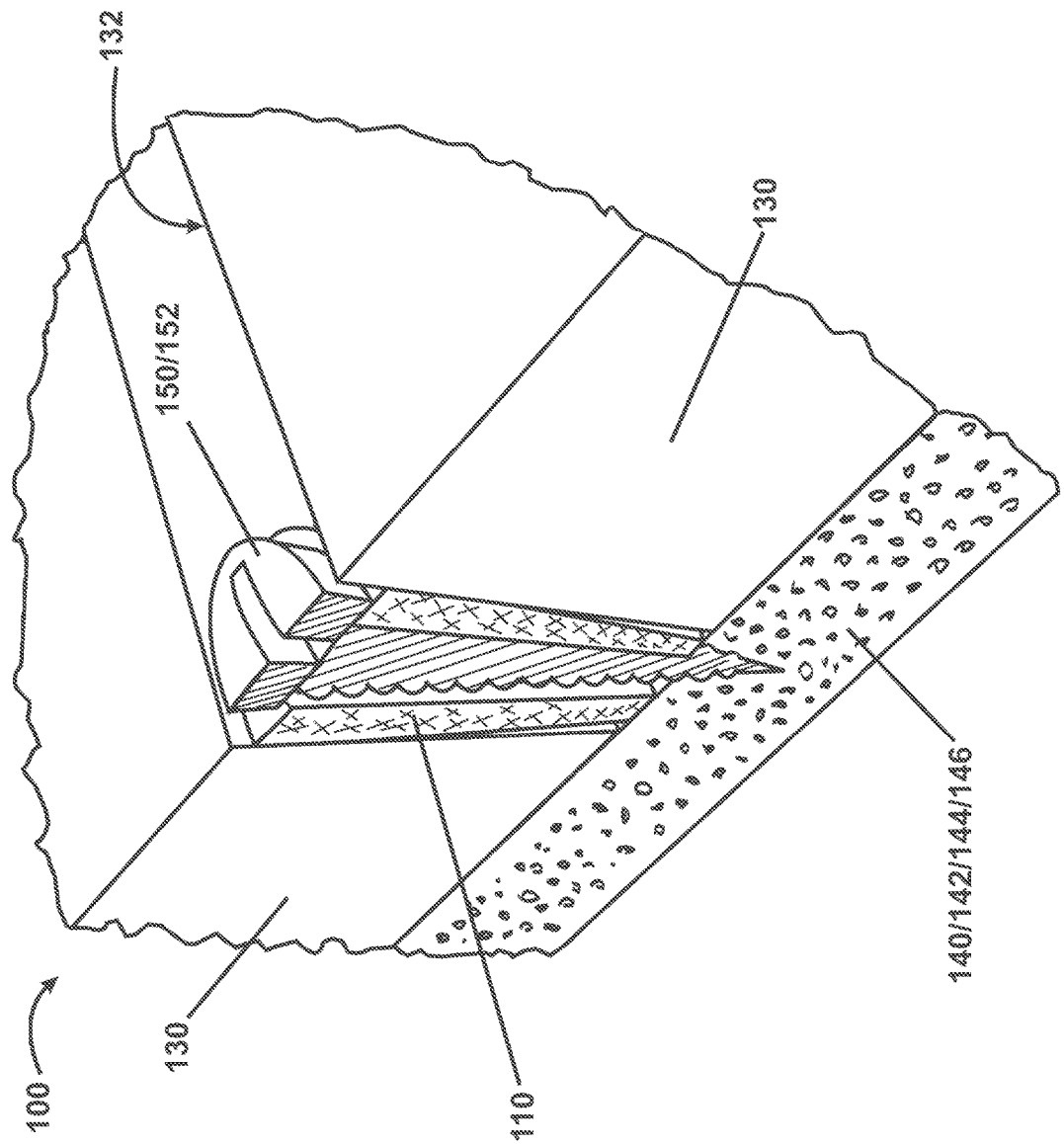
FIG. 01 is a cross-sectional perspective view of an inventive embodiment.

FIG. 01 is a cross-sectional perspective view of an embodiment of tile-securing system 100. In FIG. 01, polymeric wedge component 110 is shown as being positioned and compressed between tiles 130 for the reasons described above regarding FIGS. 06, 06A, and 03. One difference between this embodiment and some of the others shown in the figures is that polymeric wedge component 110 in FIG. 01 is shown as having a longitudinal length that causes its bottom portion to be in contact with and substantially flush with solid substrate 140. In some of the other embodiments, e.g., in FIG. 03, polymeric wedge component 110 has a relatively shorter longitudinal length such that it does not come into contact with solid substrate 140 (that can be polymeric solid substrate 142, plastic solid substrate 144, or rubber solid substrate 146).

Figure 2:
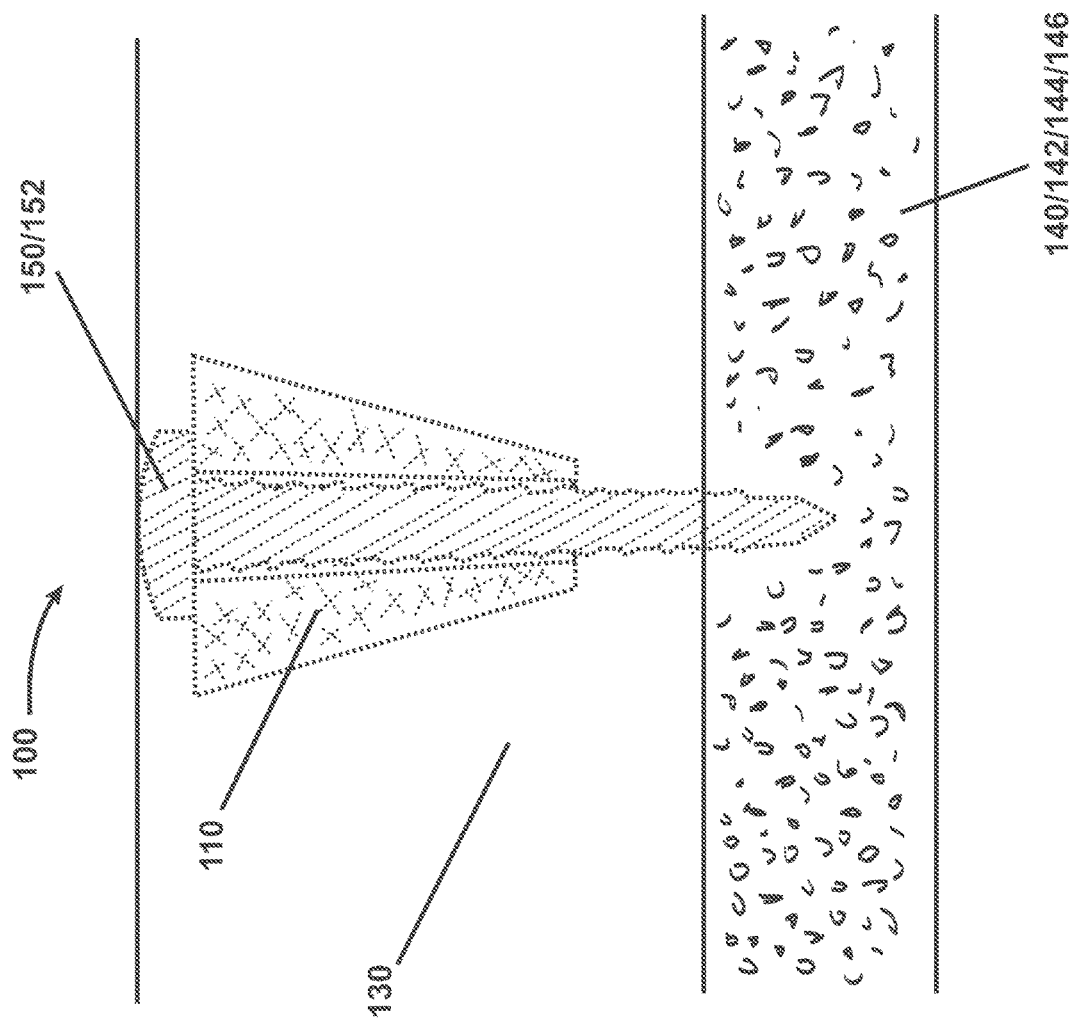
FIG. 02 is a side view of an inventive embodiment.

FIG. 02 is a side view of an embodiment of tile-securing system 100 that includes a cross-sectional view of the polymeric wedge component 110 and fastener/screw 150/152. This view is from the perspective of a side to which the polymeric wedge component is being compressed; and it is because of this perspective that the polymeric-wedge-component sides shown in phantom lines are not compressed. Phantom lines are being used to illustrate polymeric wedge component 110 and fastener/screw 150/152 because they are being viewed through tile 130 and solid substrate 140 (that can be polymeric solid substrate 142, plastic solid substrate 144, or rubber solid substrate 146).

Figure 4:
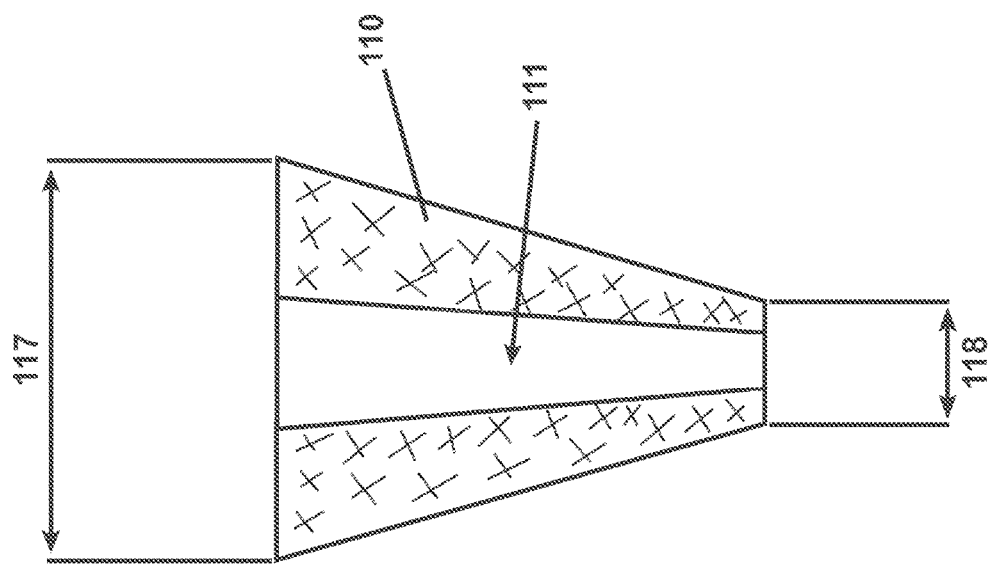
FIG. 04 is a cross-sectional side view of a wedge component.

FIG. 04 is a cross-sectional view of an embodiment of polymeric wedge component 110. In this embodiment wedge-component upper width 117 is shown as being relatively wider than wedge-component lower width 118. Screw channel 111 is also shown as being wider at the upper portion of polymeric wedge component 110 and tapered to a relatively more narrow width at the lower portion of polymeric wedge component 110. It is through screw channel 111 that fastener 150 or screw 152 passes into and through to secure polymeric wedge component 110 in place within tile-securing system 100. Persons of ordinary skill in the art will be able to select fasteners and screw channels 111 having useful widths without having to exercise undue experimentation.

Figure 4A:
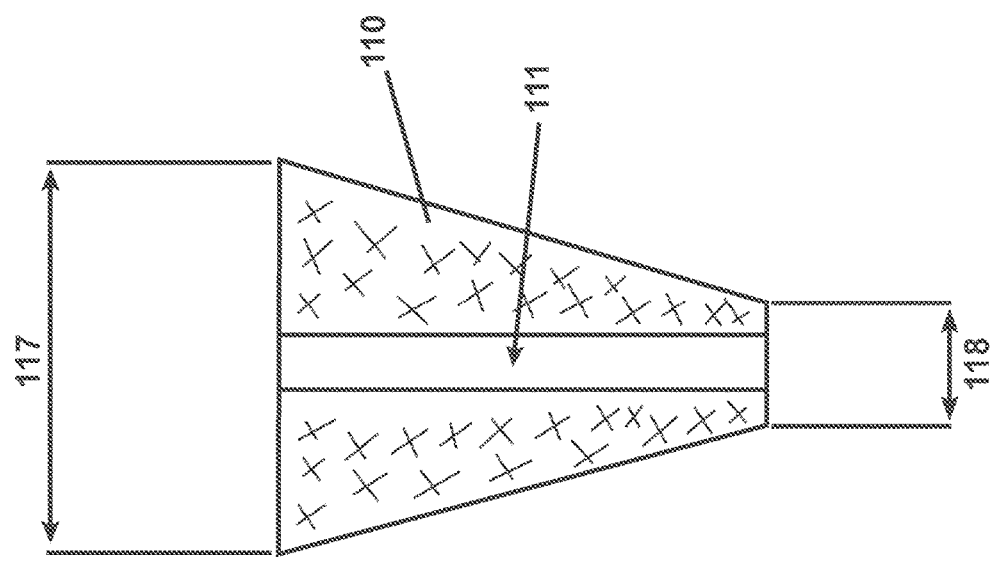
FIG. 04A is a cross-sectional side view of a wedge component.

In another embodiment, FIG. 04A shows a cross sectional view of a polymeric wedge component 110 having a screw channel width that is constant along the entire longitudinal length of polymeric wedge component 110. In this embodiment, screw channel 111 is substantially cylindrical.

FIG. 05 shows an embodiment of solid substrate 140 that is substantially rectangular. FIG. 05A is an end view, and FIG. 05B is a side view. Solid substrate 140 is the substrate upon with tiles 130 rest in into which fastener 150 is inserted to thereby secure polymeric wedge components 110 in position between tiles 130. Solid substrate 140 can be any useful substrate that fastener 150 can be secured to, and any known polymer, wood, stone, metal, metal alloy, or other useful solid substrate can be employed. Persons of ordinary skill in the art will be able to select useful solid substrates without having to exercise undue experimentation.

Figure 9:
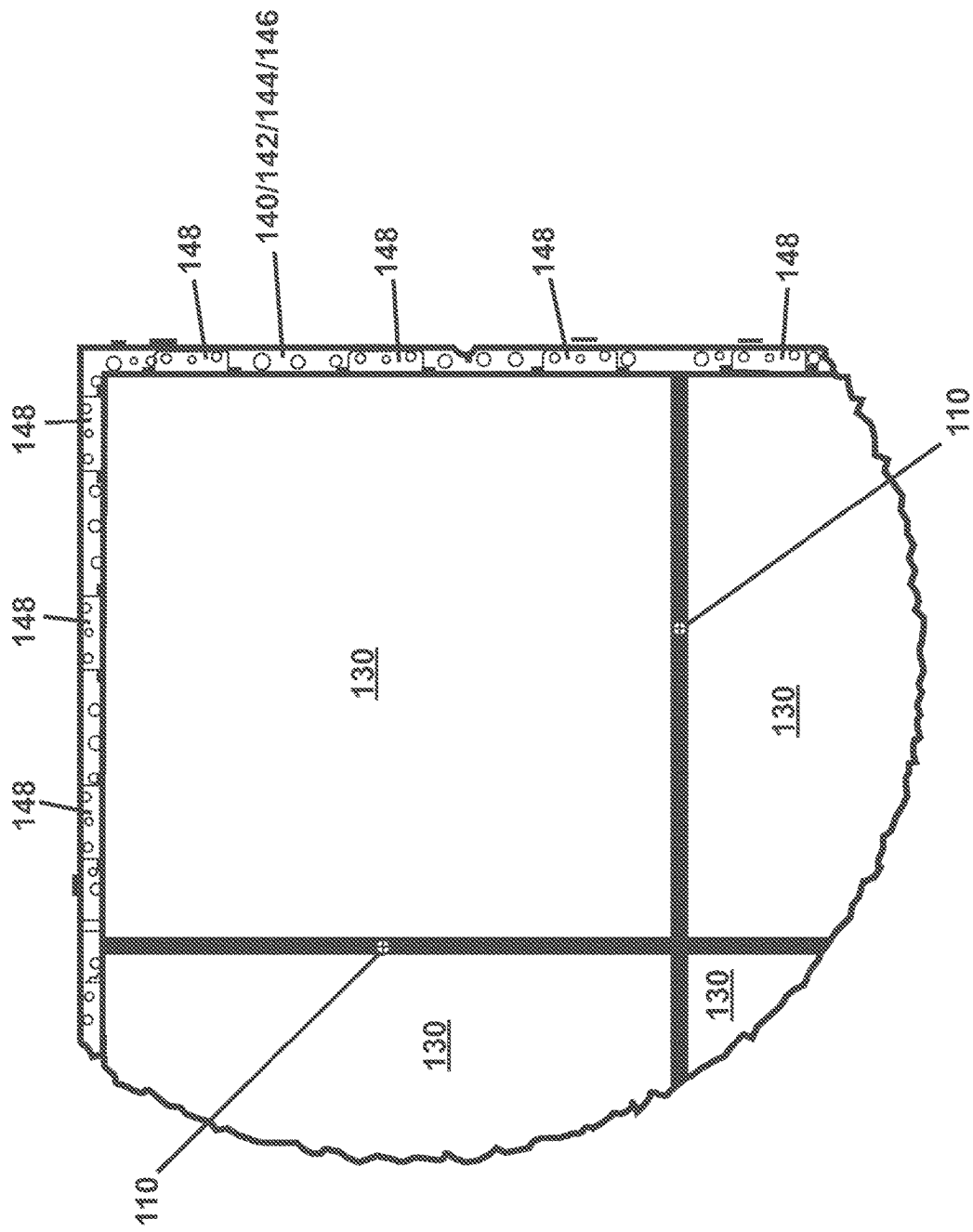
FIG. 09 is a magnified top view of a corner portion of an inventive embodiment that includes a plurality of tiles.

FIGS. 07 and 09 are magnified top views of separate corner portions of tile-securing system 100. In each view, four tiles 130 are arranged adjacent to one another and between tiles 130 are polymeric wedge components 110. Solid substrate 140 can be seen around the perimeter edges of tile-securing system 100, and on the perimeter edges of tile-securing system 100 are perimeter securing components 148 fixedly attached to solid substrate 140. In embodiments, perimeter securing components 148 secure perimeter tiles 130 in position and ensure that tiles 130 do not move outwardly as a result of the tile-securing systems 100 internal pressure(s) created by polymeric wedge components 110 (that are compressed between adjacent tiles 130). To secure tiles 130 in position, perimeter securing components 148 exert a pressure against the respective tiles 130 that they contact (as shown in the figures). Perimeter securing components 148 serve the function of maintaining the integrity of the shape or footprint of the configuration of tiles 130, and at the same time, perimeter securing components 148 also ensure that pressure tension is maintained within tile-securing system 100. Any number of perimeter securing components 148 can be employed in tile-securing system 100, and persons of ordinary skill in the art will be able to determine useful numbers and positions of perimeter securing components 148 without having to exercise undue experimentation. Perimeter securing components 148 can be any known bracket, fastener, or other mechanical component that is capable of being secured in place to solid substrate 140. FIG. 08 is a magnified non-perimeter top view of tile-securing system 100 showing a plurality of tiles 130 and polymeric wedge components 110 in position between adjacent tiles 130.

In embodiments, more than one wedge component 110 can be positioned between adjacent tiles 130 and persons of ordinary skill in the art will be able to determine useful numbers of polymeric wedge components 110 (to position between adjacent tiles 130) without having to exercise undue experimentation.

Figure 10:
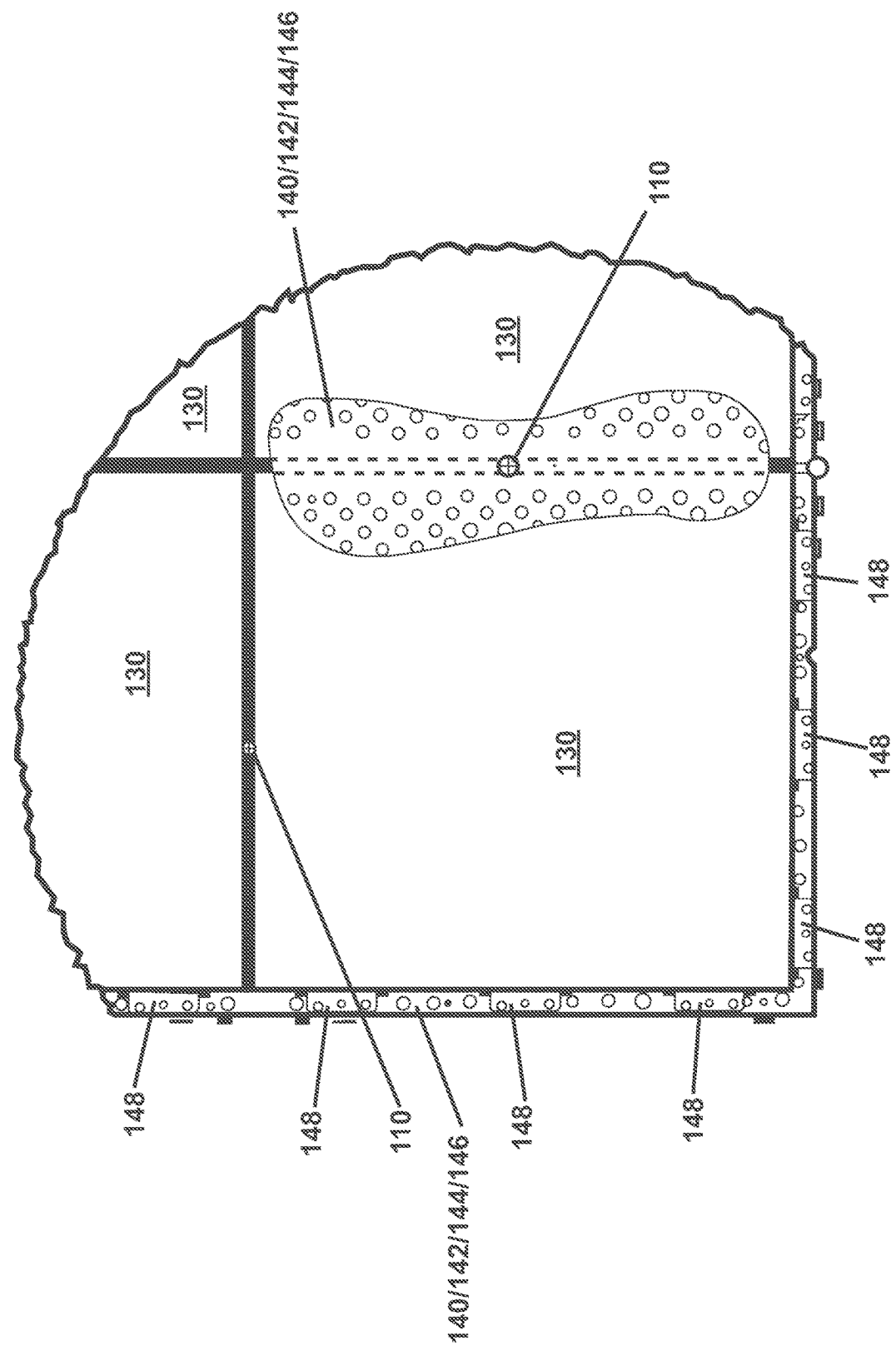
FIG. 10 is a magnified top view of a corner portion of an inventive embodiment that includes a transparent tile section through which a solid substrate component is shown.
Figure 11:
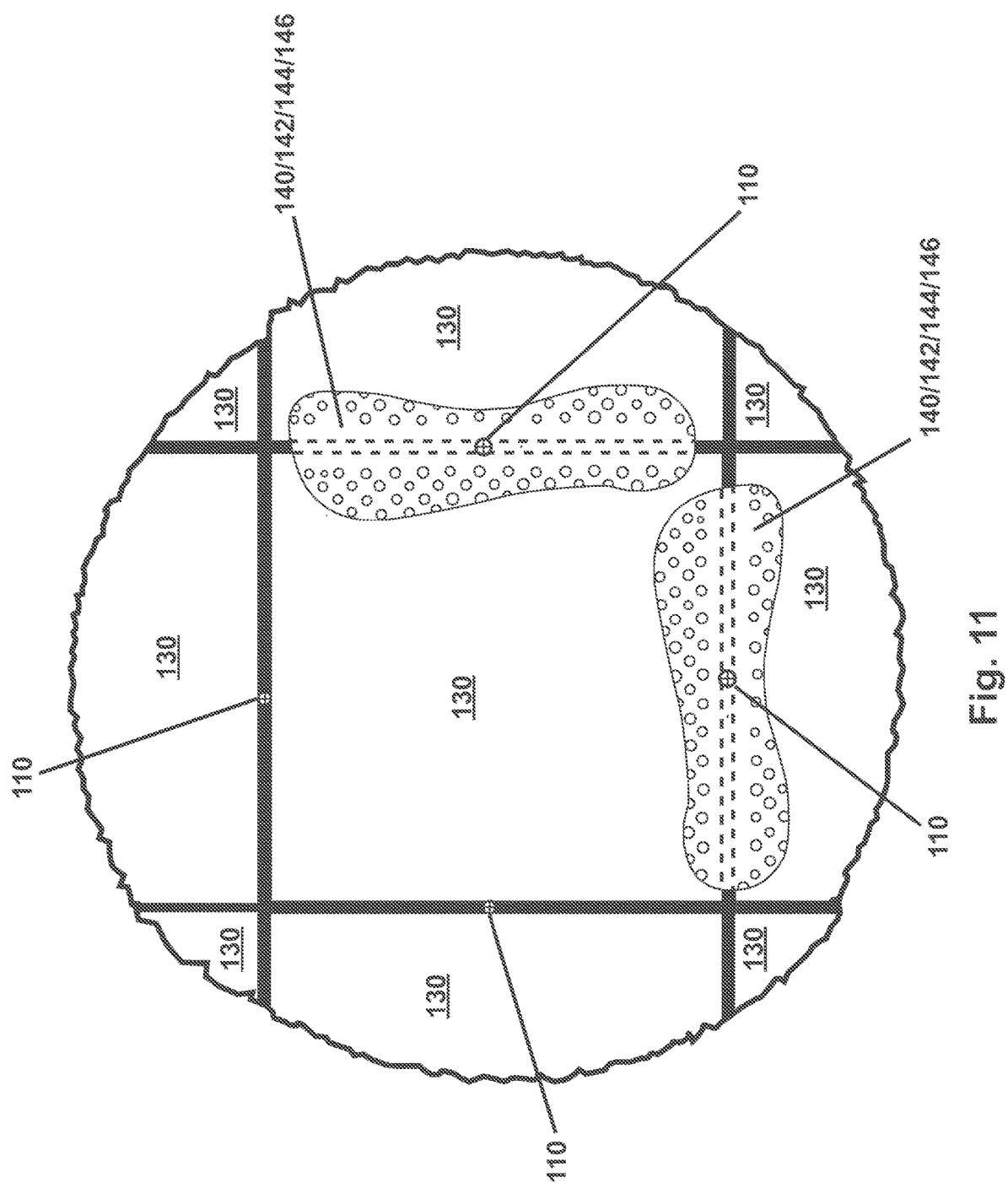
FIG. 11 is a magnified top view of a central portion of an inventive embodiment that includes two transparent tile sections through which a solid substrate component is shown.

FIGS. 10 and 11 provide additional information to what is shown in FIGS. 07 and 08. FIGS. 10 and 11 present transparent sections that allow for understanding what is occurring underneath adjacent tiles 130 within tile-securing system 100. From the transparent sections in both figures, it can be appreciated that embodiments provide for tiles 130 resting directly upon solid substrate 140 (that can be polymeric solid substrate 142, plastic solid substrate 144, or rubber solid substrate 146).

Figure 12:
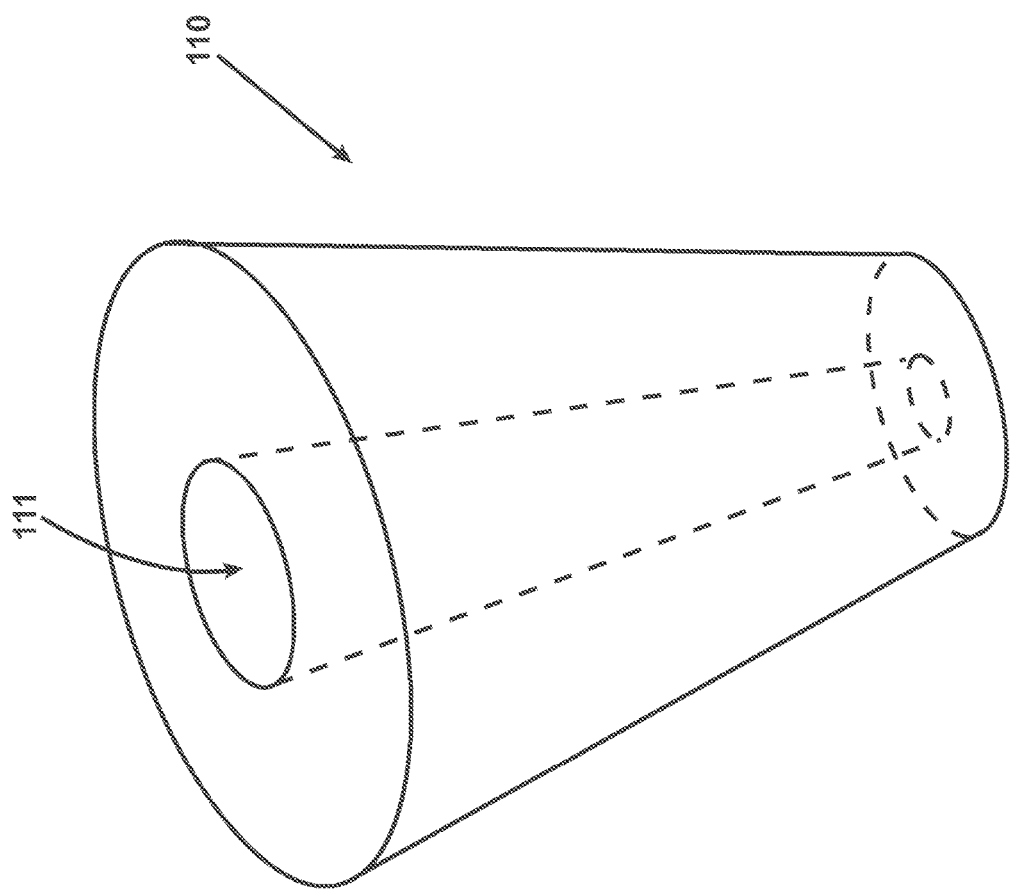
FIG. 12 is a perspective view of a wedge component.
Figure 12A:
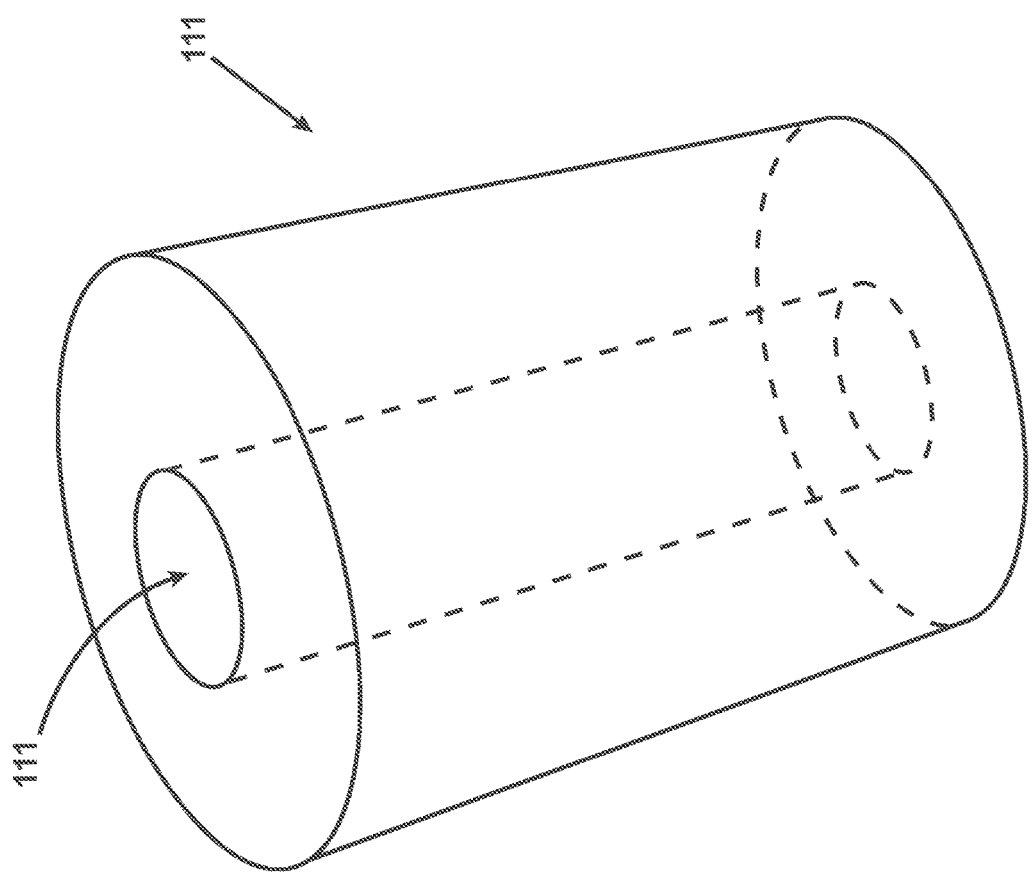
FIG. 12A is a perspective view of a wedge component.

FIGS. 12 and 12A are perspective views of useful embodiments of polymeric wedge component 110. FIG. 12 is directed to a conical polymeric wedge component 110 having screw channel 111 that is also conical or tapered. FIG. 12A is directed to a substantially cylindrical polymeric wedge component 110 having screw channel 111 that is also substantially cylindrical. FIG. 13 is a cross-sectional side view of the conical polymeric-wedge-component embodiment shown in FIG. 12, and FIG. 13A shows a similar conical polymeric-wedge-component embodiment—but in this embodiment there is a substantially cylindrical screw channel 111.

Figure 14:
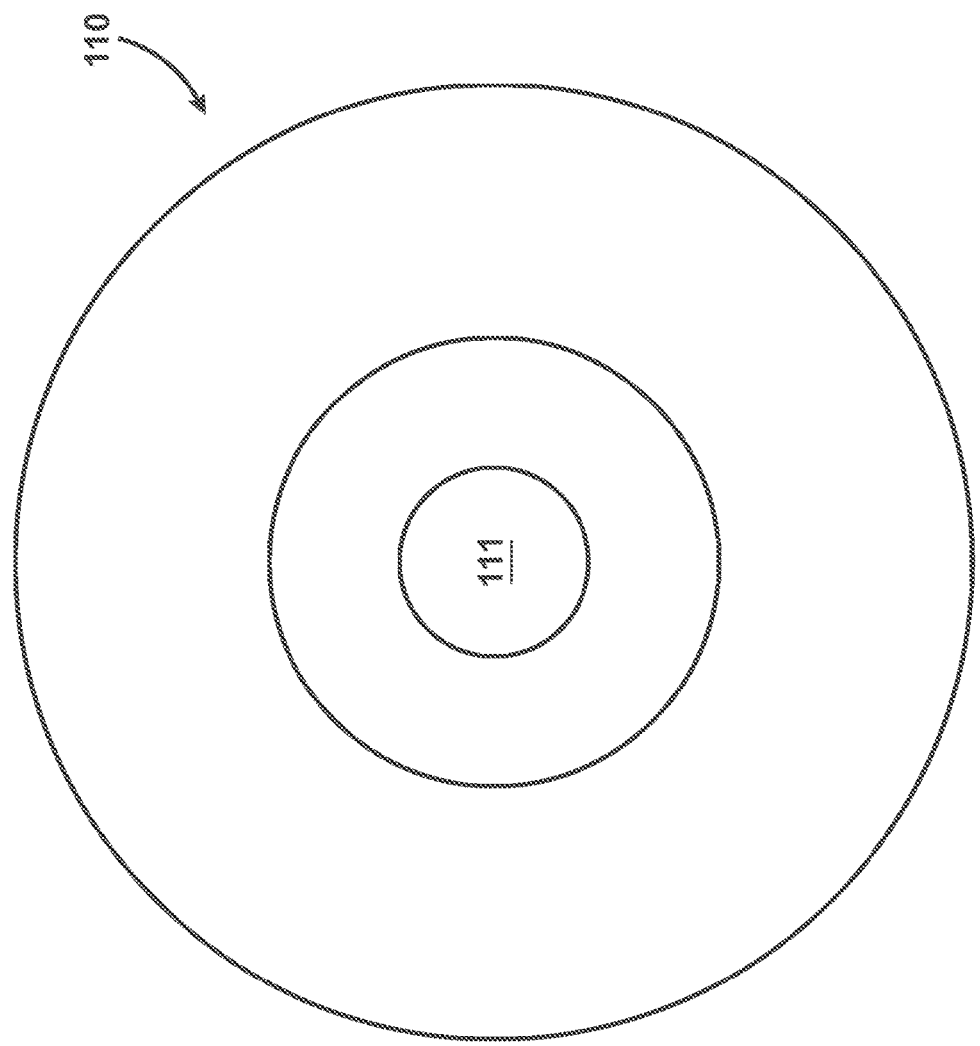
FIG. 14 is a top view of a wedge component.
Figure 14A:
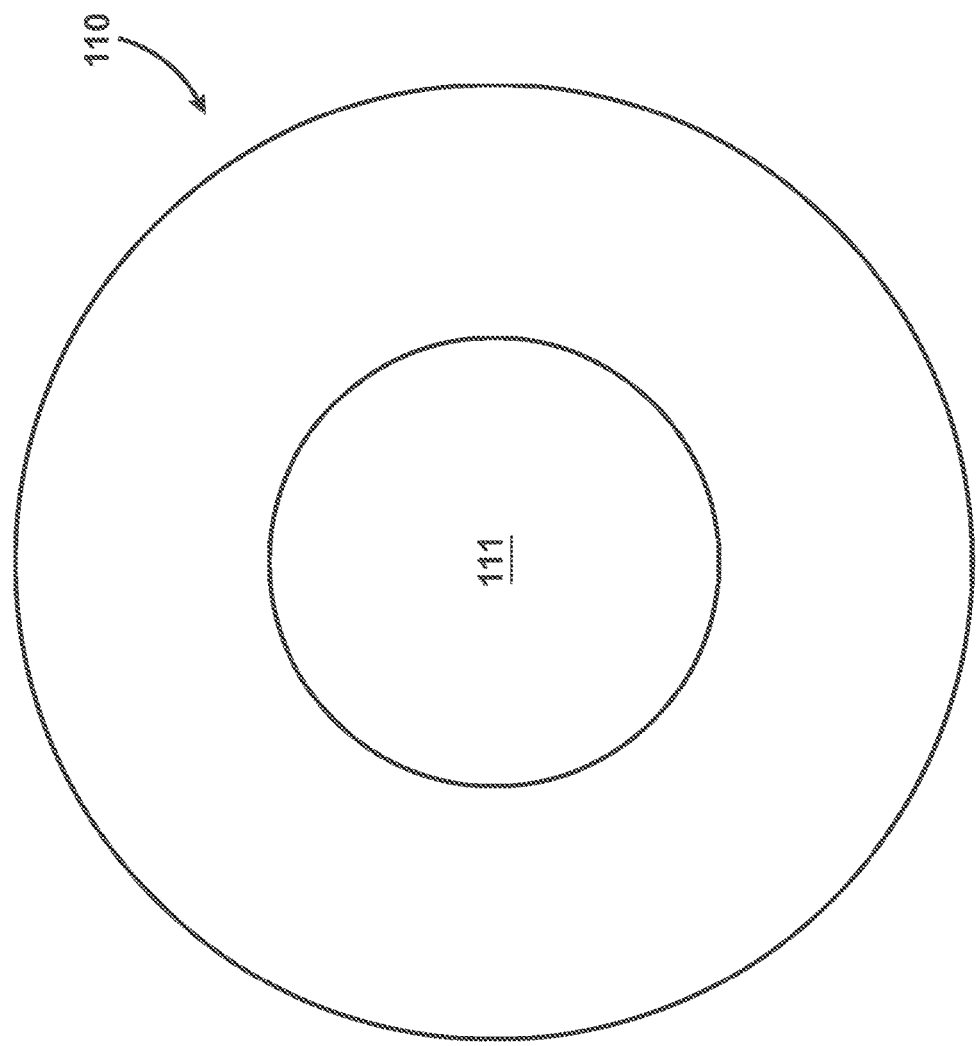
FIG. 14A is a top view of a wedge component.
Figure 15:
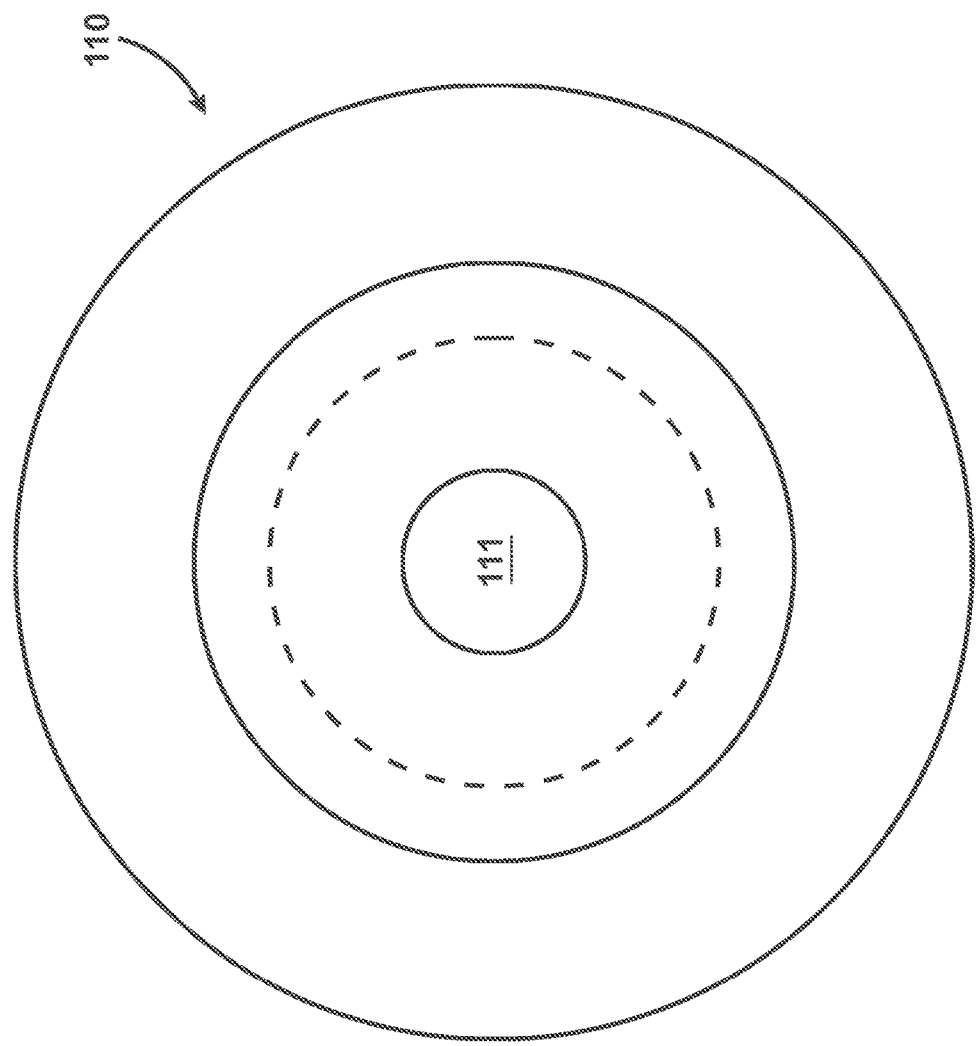
FIG. 15 is a bottom view of a wedge component.

FIG. 14 is a top view of a conical polymeric wedge component 110 having a conical screw channel 111, to help with understanding this perspective, this is a top view of the polymeric-wedge-component embodiment shown in FIGS. 12 and 13. FIG. 14A is top view of a substantially cylindrical polymeric wedge component 110 having substantially cylindrical screw channel 111; to help with understanding this perspective, this is a top view of the polymeric-wedge-component embodiment shown in FIG. 12A. FIG. 15 is a bottom view of the polymeric-wedge-component embodiment shown in FIGS. 12 and 13. FIG. 15A is a bottom view of the polymeric-wedge-component shown in FIGS. 12A and 14A.

Figure 17A:
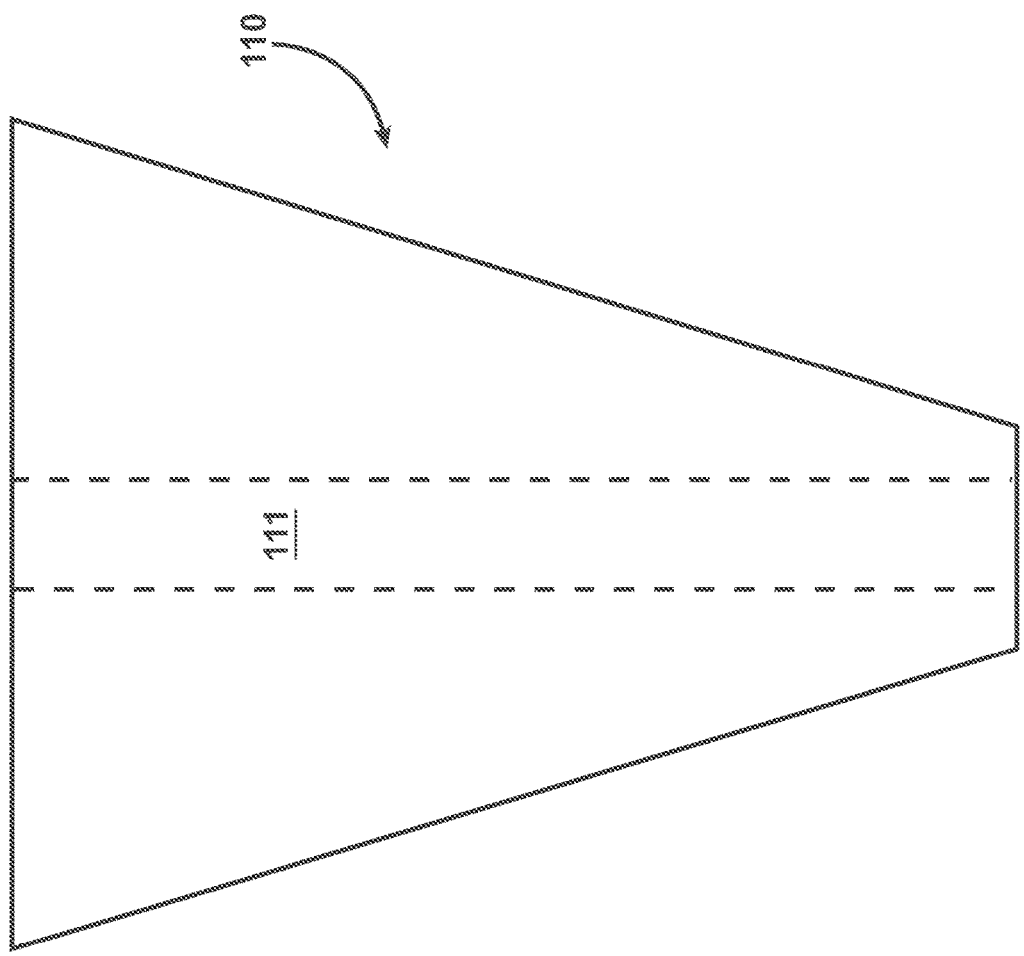
FIG. 17A is a side view of a wedge component.
Figure 18:
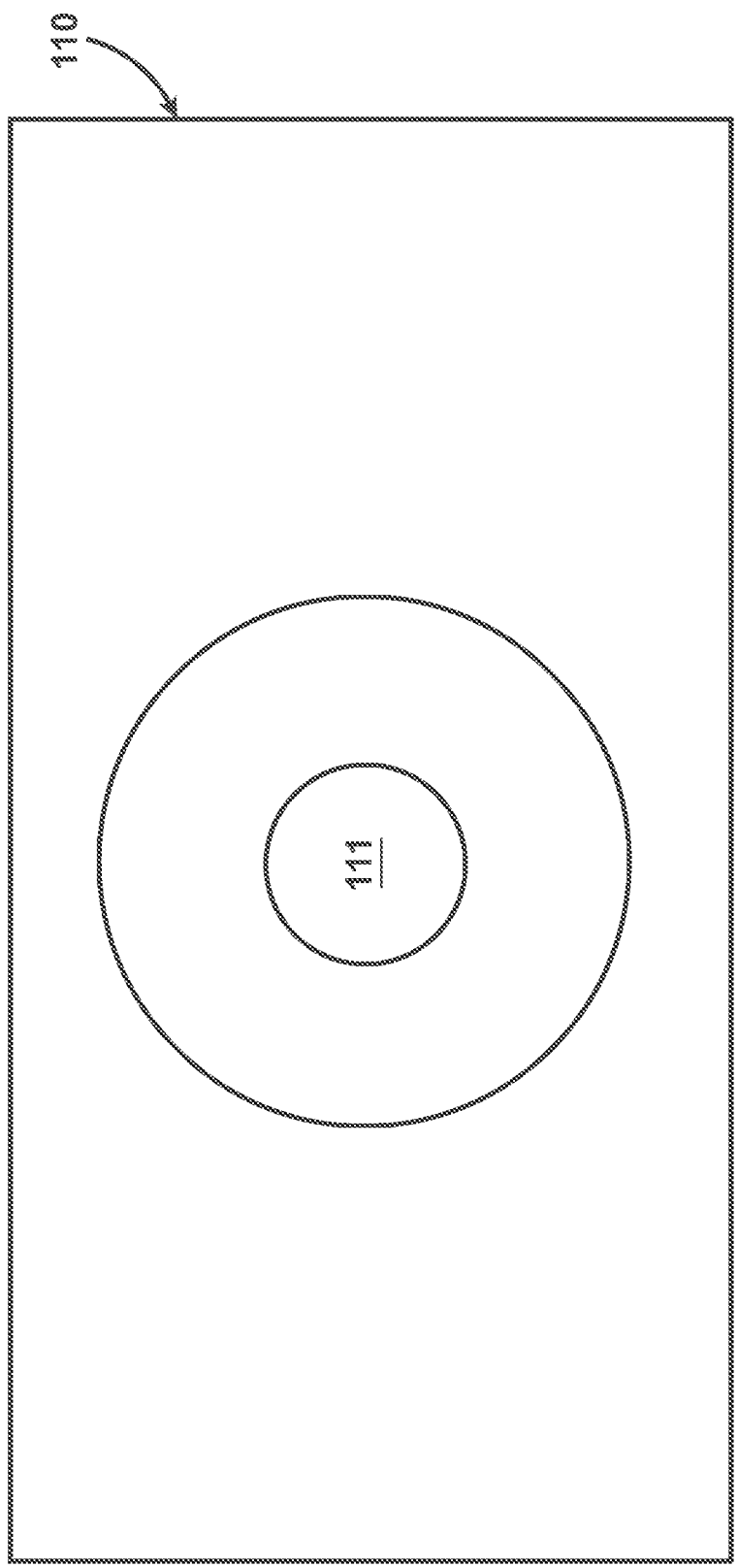
FIG. 18 is a top view of a wedge component.
Figure 18A:
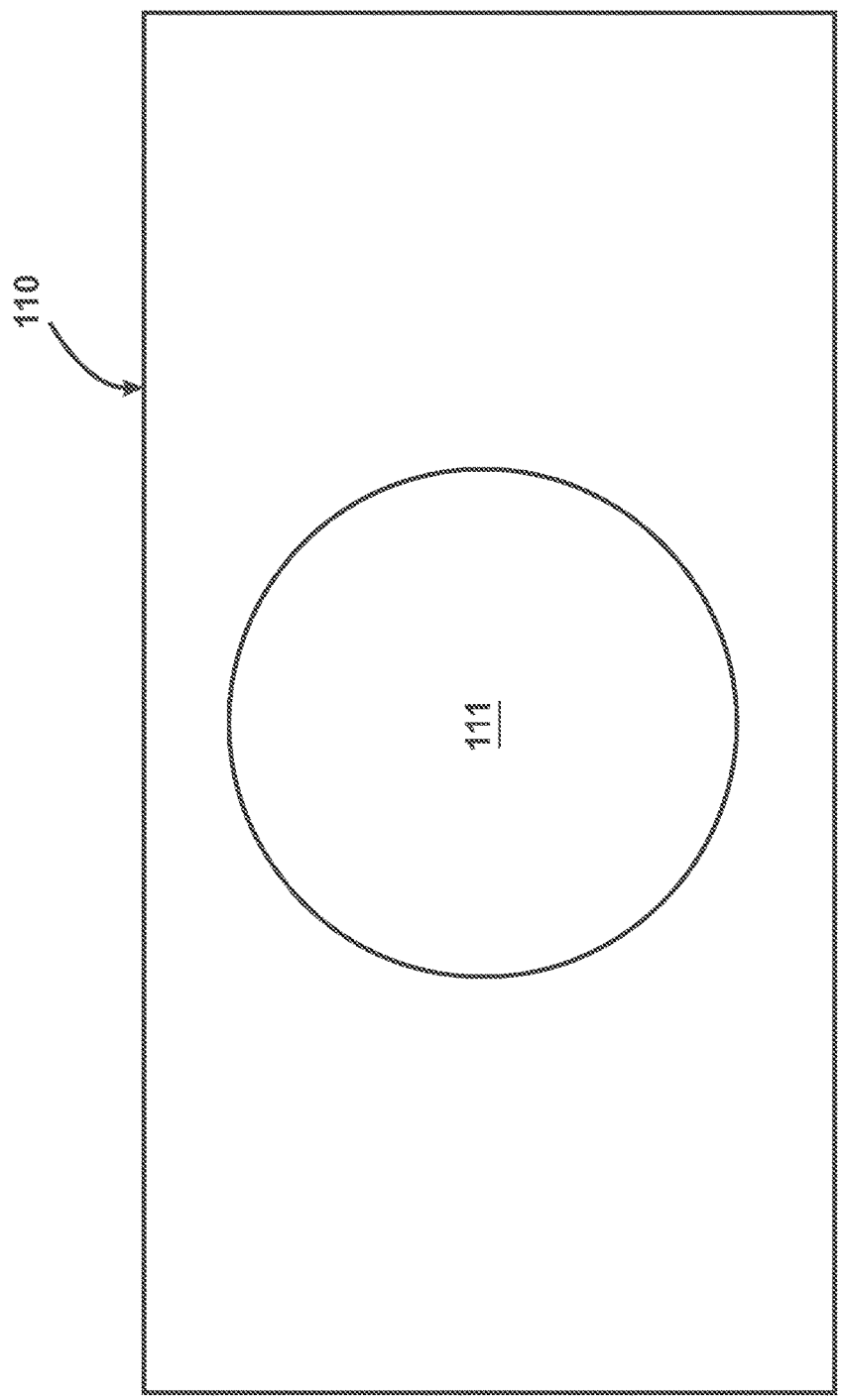
FIG. 18A is a top view of a wedge component.

FIG. 16 and FIG. 16A are perspective views of useful embodiments of polymeric wedge component 110. FIG. 16 is directed to a polymeric wedge component 110 having a trapezoidal cross-section; screw channel 111 is substantially conical. FIG. 16A is directed to a polymeric wedge component 110 having a trapezoidal and almost rectangular cross-section (see FIG. 19A); screw channel 111 is substantially cylindrical. FIG. 17 shows a central cross section of the polymeric wedge component 110 shown in FIG. 16. FIG. 17A shows a similar central cross section as that shown in FIG. 17 with the exception that FIG. 17A shows screw channel 111 being substantially cylindrical. FIG. 18 is a top view of the polymeric wedge component 110 shown in FIG. 16. FIG. 18A is a top view of the polymeric wedge component 110 shown in FIG. 16A. FIG. 19 is a bottom view of the polymeric wedge component 110 shown in FIG. 16. FIG. 19A is a bottom view of the polymeric wedge component 110 shown in FIG. 16A.

Polymeric wedge component 110 can be manufactured using any known polymer; there is no limitation on useful polymers for manufacturing polymer wedge component 110. Nonlimiting examples of useful polymers include: propylene, ethylene, propylene ethylene copolymers, low density polyethylene, ethylene propylene diene terpolymer, any known plastic or rubber having resiliency, or combinations thereof. Persons of ordinary skill in the art will be able to select useful polymers for manufacturing polymeric wedge component 100 without having to exercise undue experimentation.

The invention claimed is:

1. A tile-securing system comprising:
a polymeric wedge component positioned between two adjacent tiles that are in plane and the polymeric wedge component contacting a side edge of each adjacent tile, wherein the polymeric wedge component exerts a force against both side edges, the polymeric wedge component comprising of a longitudinal axis, wherein a width of the polymeric wedge component tapers from one end of the longitudinal axis to an opposite end of the longitudinal axis;
a fastener exerting a downforce on the polymeric wedge component, wherein the force being exerted against both side edges increases as the downforce increases, and wherein portions of the polymeric wedge component compress and flatten due to pressure as the downforce increases and as the force being exerted against both side edges increases;
the polymeric wedge component being secured to a solid substrate by a portion of the fastener being fixedly positioned within the substrate; and
the polymeric wedge component and fastener positioned between the two adjacent tiles at a side-edge portion of each tile that is approximately at a midpoint of each adjacent tile's side-edge portion.

2. The tile-securing system of claim 1, wherein each tile is a porcelain tile.

3. The tile-securing system of claim 1, wherein each tile is a non-rectified porcelain paver tile.

4. The tile-securing system of claim 1, wherein the polymeric wedge component has a conical three-dimensional exterior shape.

5. The tile-securing system of claim 1, wherein the polymeric wedge component has a substantially trapezoidal cross-sectional shape.

6. The tile-securing system of claim 1, wherein the polymeric wedge component has a quadrilateral cross-sectional shape.

7. The tile-securing system of claim 1, wherein the tiles rest upon the solid substrate.

8. The tile-securing system of claim 1, wherein the solid substrate is polymeric.

9. The tile-securing system of claim 1, wherein the solid substrate is plastic.

10. The tile-securing system of claim 1, wherein the solid substrate is rubber.

11. The tile-securing system of claim 1, wherein the polymeric wedge component is manufactured from low density polyethylene or ethylene propylene diene terpolymer.

12. The tile-securing system of claim 1, wherein the fastener is a screw.

* * * * *